(12) United States Patent
Sudo et al.

(10) Patent No.: US 6,714,511 B1
(45) Date of Patent: Mar. 30, 2004

(54) OFDM TRANSMISSION/RECEPTION APPARATUS HAVING A GUARD INTERVAL LENGTH CHANGING FUNCTION

(75) Inventors: Hiroaki Sudo, Yokohama (JP); Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/464,388

(22) Filed: Dec. 16, 1999

(30) Foreign Application Priority Data

Dec. 22, 1998 (JP) .......................... 10-365430
Mar. 18, 1999 (JP) .......................... 11-074621

(51) Int. Cl.[7] .............................................. H04J 11/00
(52) U.S. Cl. ..................... 370/208; 370/210; 375/260
(58) Field of Search ................. 370/203, 204, 370/208, 209, 210, 503, 480; 375/260, 261; 708/200, 400, 403, 404, 405

(56) References Cited

U.S. PATENT DOCUMENTS

| | | | |
|---|---|---|---|
| 5,371,548 A | | 12/1994 | Williams |
| 5,657,313 A | * | 8/1997 | Takahashi et al. .......... 370/491 |
| 5,675,572 A | * | 10/1997 | Hidejima et al. ........... 370/206 |
| 5,732,068 A | * | 3/1998 | Takahashi et al. .......... 370/206 |
| 5,818,813 A | * | 10/1998 | Saito et al. ................ 370/208 |
| 5,822,323 A | * | 10/1998 | Kaneko et al. ............. 370/480 |
| 5,953,311 A | * | 9/1999 | Davies et al. .............. 370/210 |
| 6,088,327 A | * | 7/2000 | Muschallik et al. ........ 370/210 |
| 6,115,354 A | * | 9/2000 | Weck ......................... 370/203 |
| 6,125,124 A | * | 9/2000 | Junell et al. ............... 370/503 |
| 6,304,611 B1 | * | 10/2001 | Miyashita et al. .......... 375/260 |
| 6,359,938 B1 | * | 3/2002 | Keevill et al. .............. 375/316 |

FOREIGN PATENT DOCUMENTS

| | | |
|---|---|---|
| JP | 7-99486 | 4/1995 |
| JP | 9-284200 | 10/1997 |
| WO | 97/30531 | 8/1997 |

OTHER PUBLICATIONS

English language abstract of JP 7-99486.
English language abstract of JP 9-284200.

* cited by examiner

*Primary Examiner*—Douglas Olms
*Assistant Examiner*—Bob A. Phunkulh
(74) *Attorney, Agent, or Firm*—Greenblum & Bernstein, P.L.C.

(57) ABSTRACT

The subtractor of the reception system calculates the channel quality using an optimal guard interval length detection signal inserted into one carrier by the transmission system, then the optimal guard interval length detector calculates the minimum guard interval length necessary to eliminate delayed signals using this calculated channel quality, inserts the control signal indicating this guard interval length into one carrier and the reception system sets the guard interval length using this control signal.

27 Claims, 29 Drawing Sheets

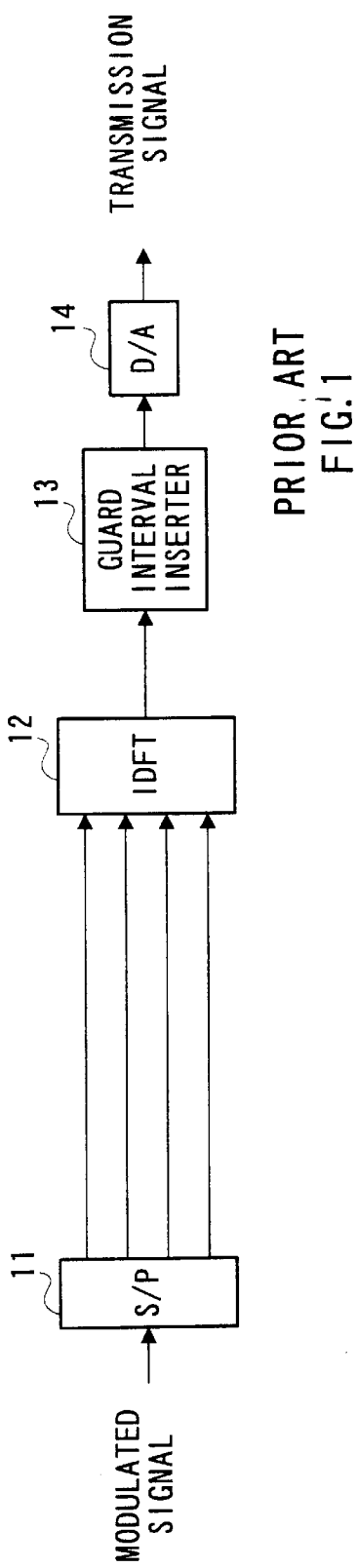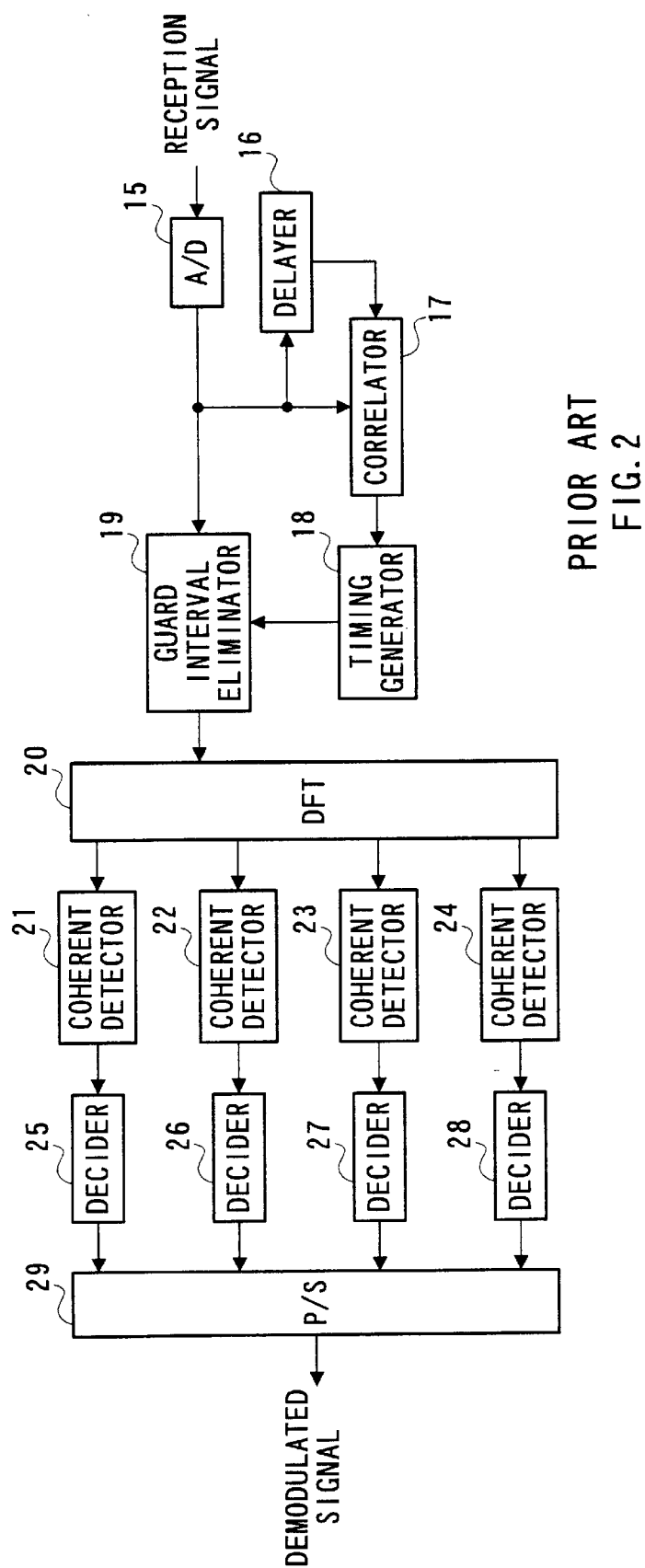

OFDM TRANSMISSION/RECEPTION APPARATUS HAVING A GUARD INTERVAL LENGTH CHANGING FUNCTION

BACKGROUND OF THE INVENTION

1. Field of the Invention

The present invention relates to a transmission/reception apparatus used for digital mobile communications using an orthogonal frequency division multiplexing (hereinafter referred to as "OFDM) system.

2. Description of the Related Art

A conventional OFDM transmission/reception apparatus is explained using FIG. 1 and FIG. 2. FIG. 1 is a block diagram showing an outlined configuration of a transmission system of a conventional OFDM transmission/reception apparatus. FIG. 2 is a block diagram showing an outlined configuration of a reception system of the conventional OFDM transmission/reception apparatus.

In FIG. 1, serial-parallel converter (hereinafter referred to as "S/P converter") 11 converts a serial input signal to a plurality of parallel signals. IDFT circuit 12 performs inverse discrete Fourier transform (hereinafter referred to as "IDFT") on the input signals. Guard interval inserter 13 inserts a guard interval for every valid symbol. D/A converter 14 performs D/A conversion on the signal with guard interval inserted.

In FIG. 2, A/D converter 15 performs A/D conversion on a reception signal. Delayer 16 delays the input signal by a valid symbol length. Correlator 17 despreads the input signal. Timing generator 18 detects the timing of the reception signal at which the correlation result becomes largest. Guard interval eliminator 19 eliminates a guard interval inserted for every symbol. DFT circuit 20 performs discrete Fourier transform (hereinafter referred to as "DFT") on the input signal. Coherent detectors 21 to 24 perform coherent detection on the input signal. Deciders 25 to 28 judge the input signal. Parallel-serial converter (hereinafter referred to as "P/S converter") 29 converts a plurality of parallel signals to a serial signal.

Then, the operation of the conventional OFDM transmission/reception apparatus is explained. Here, suppose the number of carriers is 4, for example.

First, the operation of the transmission system is explained using FIG. 1. A modulated signal input to the transmission system is S/P-converted by S/P converter 11. This results in four modulated signals, which are transmitted by a first, second, third and fourth carriers, respectively.

Then, the 4 modulated signals are IDFT-processed by IDFT circuit 12.

A general OFDM transmission/reception apparatus has a frame format as shown in the frame format schematic diagram in FIG. 3. That is, in a frame format used for a general OFDM transmission/reception apparatus, a signal with the same waveform as that of the last part of a valid symbol is added at the start of the valid symbol as a guard interval. The OFDM transmission/reception apparatus can eliminate a delayed signal with a shorter delay time than this guard interval through DFT processing of the reception system.

Guard interval inserter 13 inserts a guard interval into the IDFT-processed signal. The signal with the guard interval inserted is converted to an analog signal by D/A converter 14. In this way, a transmission signal is obtained.

Then, the operation of the reception system is explained using FIG. 2. The reception signal input to the reception system is converted to a digital signal by A/D converter 15.

Generally, the OFDM transmission/reception apparatus finds a correlation between a pre-DFT signal and the pre-DFT signal delayed by a valid symbol length. Then, the OFDM transmission/reception apparatus detects a DFT integration interval by detecting the timing at which the correlation result becomes largest. To be more specific, delayer 16 delays the reception signal by a valid symbol length, then correlator 17 finds a correlation and timing generator 18 detects the timing at which the correlation result becomes largest. Guard interval eliminator 19 eliminates the guard interval from the reception signal according to this detection result.

The reception signal stripped of the guard interval is DFT-processed by DFT circuit 20. This results in 4 baseband signals, which are carried by 4 carriers. The 4 baseband signals are each subjected to coherent detection by coherent detectors 21 to 24. In this way, coherent detected signals are obtained.

Here, coherent detectors 21 to 24 are explained using FIG. 4. FIG. 4 is a block diagram showing an outlined configuration of the coherent detector of the OFDM transmission/reception apparatus. Digital multipliers 41 and 42 multiply the DFT-processed signals by pilot symbols. Conjugate complex number generator 43 generates a conjugate complex number for the input signal.

In a general frame format, a pilot symbol, a known reference signal, is added before a message interval. In a general coherent detection method, a fading variation is detected using a pilot symbol.

In(nT) which is a DFT-processed input signal in a pilot symbol interval is expressed as $In(nT)=P(nT) \cdot A(nT) \cdot \exp(j\Theta(nT))$, where P(nT) is a pilot symbol, A(nT) is an amplitude variation due to fading and $\exp(j\Theta(nT))$ is a phase variation due to fading.

F(nT), which represents a variation due to fading, is expressed as follows:

$$F(nT) = In(nT) \cdot P(nT) \quad \text{①}$$
$$= \{P(nT) \cdot A(nT) \cdot \exp(j\Theta(nT))\} \cdot P(nT)$$
$$= P(nT)^2 \cdot A(nT) \cdot \exp(j\Theta(nT))$$

Here, in a modulation system such as a QPSK modulation system in which the amplitude is constant and only the phase contains information, $P(nT)^2=1$. Therefore, expression ① is expressed as follows:

$$F(nT)=A(nT) \cdot \exp(j\Theta(nT))$$

Then, digital multiplier 41 obtains signal F(nT) that represents a variation due to fading by multiplying DFT-processed input signal (baseband signal) In(nT) by pilot symbol P(nT) in a pilot symbol interval.

Then, conjugate complex number generator 43 generates a conjugate complex number about F(nT), a signal representing a variation due to fading. In this way, conjugate complex number F(nT)* of F(nT) signal expressing a variation due to fading is obtained. Conjugate complex number generator 43 inverts the polarity of the Q component of the input signal and generates a conjugate complex number. Therefore, conjugate complex number F(nT)* is expressed in the following expression:

$$F(nT)^*=A(nT) \cdot \exp(-j\Theta(nT))$$

Then, digital multiplier 42 multiplies the DFT-processed input signal (baseband signal) by the conjugate complex number of the signal representing a variation due to fading. In this way, a coherent detected signal is obtained.

Here, suppose the fading variation is sufficiently slow compared to the interval of pilot symbols and the fading variation is constant between pilot symbols. Based on this supposition, coherent detected signal $D_{out}(nT)$ is expressed in the following expression:

$$D_{out}(nT) = D_{in}(nT) \cdot A(nT) \cdot \exp(j\Theta(nT)) \cdot \quad (2)$$
$$A(nT) \cdot \exp(-j\Theta(nT))$$
$$= D_{in}(nT) \cdot A(nT)^2$$

In expression (2), $A(nT)^2$ is the component with a constant phase and variable amplitude. Therefore, the phase variation of coherent detected signal $D_{out}(nT)$ is only dependent on $D_{in}(nT)$. Therefore, the phase of the reception signal is demodulated by digital multiplier 42 multiplying the DFT-processed input signal (baseband signal) by a conjugate complex number of the signal indicating a variation due to fading. The QPSK modulation system is a modulation system with a constant amplitude and variable phase. Therefore, the OFDM transmission/reception apparatus performs coherent detection by demodulating the phase of the reception signal.

Furthermore, the OFDM transmission/reception apparatus can also eliminate any phase difference between transmission and reception carriers and phase variation by frequency offset as well as fading variation.

In a modulation system such as a 16QAM modulation system with a variable phase and variable amplitude, the OFDM transmission/reception apparatus detects a fading variation by dividing an input signal in the pilot symbol interval by a pilot symbol. The OFDM transmission/reception apparatus then performs coherent detection by dividing the input signal by a signal indicating a fading variation.

The OFDM transmission/reception apparatus can also use a delay detection system as the demodulation system.

The coherent signals detected by coherent detectors 21 to 24 are judged by Deciders 25 to 28. After judgment, the 4 signals are converted to a single signal by P/S converter 29. In this way, a demodulated signal is obtained.

As shown above, the conventional OFDM transmission/reception apparatus adds a signal with the same waveform as that of the last part of a valid symbol at the start of the valid symbol as a guard interval. By providing the guard interval, the OFDM transmission/reception apparatus can eliminate a delayed signal whose delay time is shorter than the guard interval through DFT processing of the reception system.

The explanation above referred to a case where the number of carriers is 4, but the same apparatus configuration can also be used when the number of carriers is increased to 8, 16, 32, 64, and so on.

However, the conventional OFDM transmission/reception apparatus adds a guard interval with a fixed length for every valid symbol independently of the channel quality. Therefore, in the case that the channel quality is good and the delay time of the delayed signal is short, a guard interval that is longer than necessary is added, which deteriorates the transmission efficiency.

SUMMARY OF THE INVENTION

It is an objective of the present invention to provide an OFDM transmission/reception apparatus capable of improving the transmission efficiency while maintaining the function of adding a guard interval to eliminate a delayed signal.

In order to achieve the objective above, the OFDM transmission/reception apparatus of the present invention changes the length of a guard interval added at the start of a valid symbol suitably to maintain the minimum necessary length of the guard interval (that is, the guard interval of an appropriate length) to eliminate a delayed signal at a given moment and in a given environment.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 1 is a block diagram showing an outlined configuration of a transmission system of a conventional OFDM transmission/reception apparatus;

FIG. 2 is a block diagram showing an outlined configuration of a reception system of the conventional OFDM transmission/reception apparatus;

DETAILED DESCRIPTION OF THE PREFERRED EMBODIMENTS

With reference now to the attached drawings, the embodiments of the present invention are explained in detail below.

Embodiment 1

Figure 5:
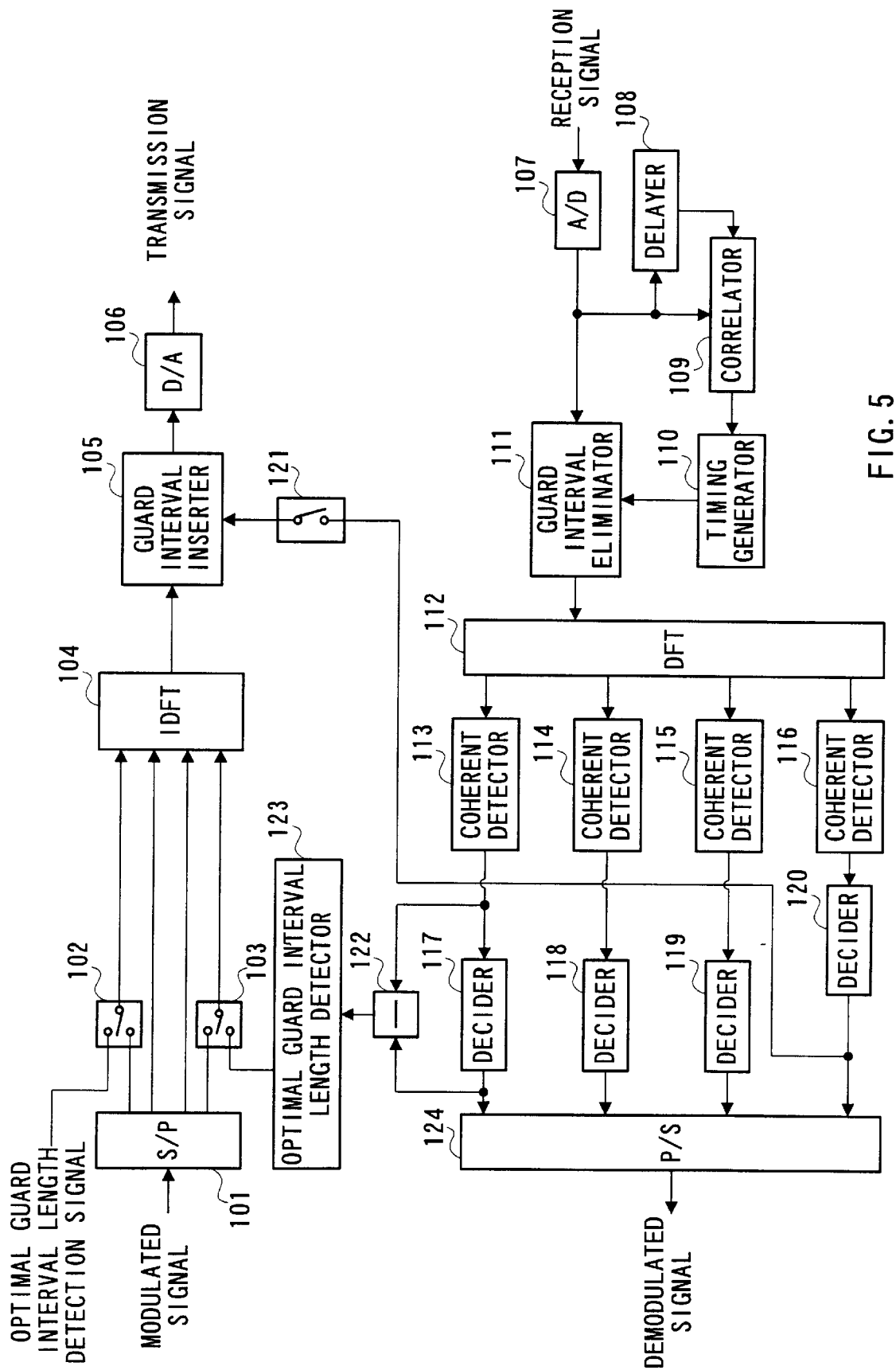
FIG. 5 is a block diagram showing an outlined configuration of an OFDM transmission/reception apparatus according to Embodiment 1 of the present invention.

The OFDM transmission/reception apparatus according to Embodiment 1 of the present invention is explained using FIG. 5. FIG. 5 is a block diagram showing an outlined configuration of the OFDM transmission/reception apparatus according to Embodiment 1 of the present invention.

S/P converter 101 converts a serial input signal to a plurality of parallel signals. Switches 102 and 103 switch between two input signals and outputs either of the two. IDFT circuit 104 performs IDFT processing on the input signals. Guard interval inserter 105 inserts a guard interval into the input signal for every valid symbol. D/A converter 106 performs D/A conversion on the signal with a guard interval inserted. In this way, a transmission signal is obtained.

A/D converter 107 performs A/D conversion on a reception signal. Delayer 108 delays the input signal by a valid symbol length. Correlator 109 despreads the input signal. Timing generator 110 detects the timing of the reception signal at which the correlation value becomes largest. Guard interval eliminator 111 eliminates the guard interval inserted for every valid symbol. DFT circuit 112 performs DFT processing on the input signal.

Coherent detectors 113 to 116 perform coherent detection on the input signal. Deciders 117 to 120 judge the input signals. Switch 121 selects a control signal to select the optimal guard length from the signal output from Decider 120. Subtractor 122 performs a subtraction between the signal input to Decider 117 and the signal output from Decider 117. Optimal guard interval length detector 123 generates a control signal to select the optimal guard interval length from the output of subtractor 122. P/S converter 124 converts a plurality of parallel input signals to a serial signal.

Then, the operation of the OFDM transmission/reception apparatus according to the present embodiment is explained. Here, a case where the number of carriers is 4 is explained, for example.

First, the operation of the transmission system is explained. The OFDM transmission/reception apparatus of the present embodiment adds a signal to detect an optimal guard interval length (hereinafter referred to as "optimal guard interval length detection signal") to a carrier (here, a first carrier, for example) and adds a control signal to select an optimal guard interval length (hereinafter referred to as "optimal guard interval length selection control signal") to a carrier (here, a fourth carrier, for example). The OFDM transmission/reception apparatus of the present embodiment can also add an optimal guard interval length detection signal and optimal guard interval length selection control signal to a same carrier.

A plurality of symbols contained in the optimal guard interval length detection signal indicates different guard interval lengths. Here, suppose a symbol period consists of 8 symbols and an optimal guard interval length detection signal consists of 4 symbols. Therefore, in the case that the decision error of the first symbol is large, the first symbol of the optimal guard interval length detection signal indicates that a guard interval length of "symbol period/2" is required. Likewise, the second symbol indicates that a guard interval length of "3×symbol period/4" is required; third symbol, a guard interval length of "symbol period/8"; and fourth symbol, a guard interval lengths of "symbol period/8."

A demodulated signal input to the transmission system is S/P-converted by S/P converter 101. This results in 4 demodulated signals, which are transmitted by a first carrier, second carrier, third carrier and fourth carrier, respectively.

Switch 102 switches between the demodulated signal transmitted by the first carrier and the optimal guard interval length detection signal and outputs either one to IDFT circuit 104. Furthermore switch 103 switches between the demodulated signal transmitted by the fourth carrier and the optimal guard interval length selection control signal and outputs either one to IDFT circuit 104.

IDFT circuit 104 performs IDFT processing on the modulated signals output from S/P converter 101, which are transmitted by the second and third carrier. Furthermore, IDFT circuit 104 performs IDFT processing on the signals output from switches 102 and 103.

Figure 3:
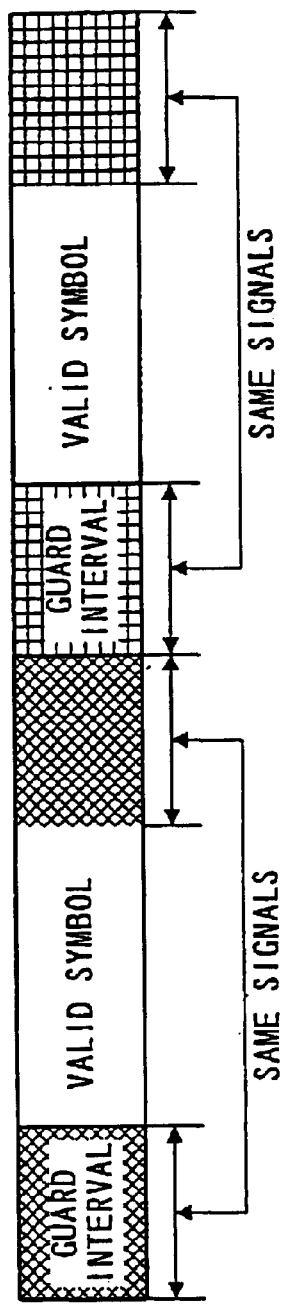
FIG. 3 is a schematic diagram of a frame format in an OFDM-based radio communication.
Figure 4:
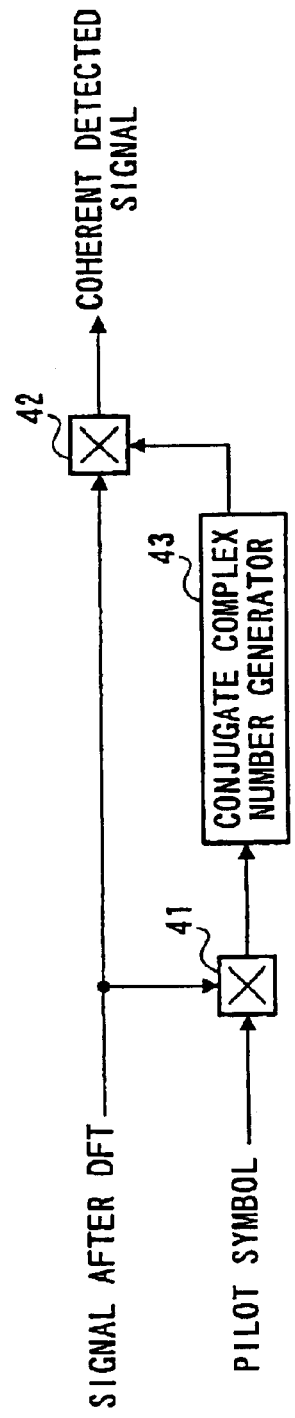
FIG. 4 is a block diagram showing an outlined configuration of a coherent detector of an OFDM transmission/reception apparatus.

Then, guard interval inserter 105 adds a guard interval into the IDFT-processed signal. An OFDM transmission/reception apparatus generally uses a frame format as shown in the frame format schematic diagram in FIG. 3. That is, in the frame format generally used in an OFDM transmission/reception apparatus, the signal having the same waveform as that at the last part of a valid symbol is added at the start of the valid symbol as a guard interval. The OFDM transmission/reception apparatus can eliminate a delayed signal whose delay time is shorter than the length of this guard interval through DFT processing of the reception system.

The signal with a guard interval added is converted to an analog signal by D/A converter 106 and becomes a transmission signal.

Figure 6:
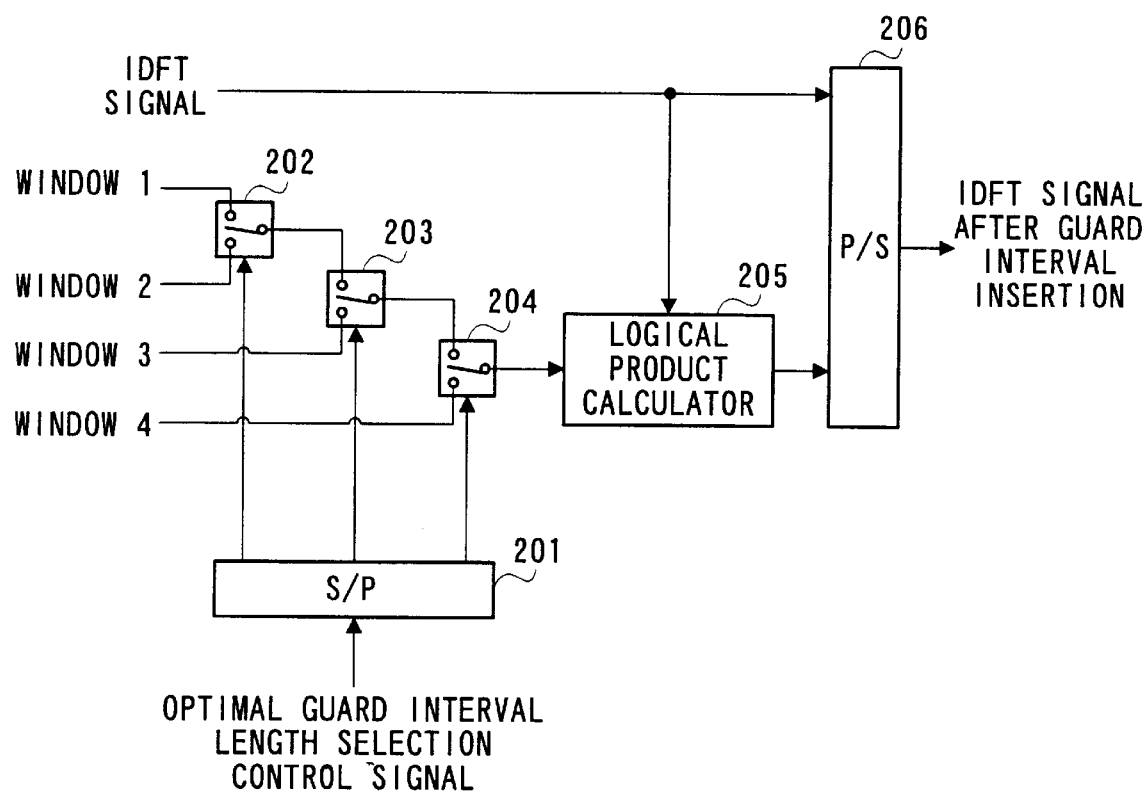
FIG. 6 is a block diagram showing an outlined configuration of a guard interval inserter of the OFDM transmission/reception apparatus according to Embodiment 1.

Here, guard interval inserter 105 is explained using FIG. 6. FIG. 6 is a block diagram showing an outlined configuration of the guard interval inserter of the OFDM transmission/reception apparatus of the present embodiment.

S/P converter 201 performs S/P conversion on the optimal guard interval length selection control signal, which is the output of Decider 120. Switches 202 to 204 switch between two input signals and outputs either one. Logical product calculator 205 performs a logical product calculation of the two input signals. P/S converter 206 converts a plurality of parallel input signals to a serial signal.

The optimal guard interval length selection control signal is split into three control signals for switches 202, 203 and 204 by S/P converter 201.

To switch 202, window signal 1 with a high-level interval of "symbol period/2" and window signal 2 with a high-level interval of "3×symbol period/8" are input. On the other hand, to switch 203, the output signal of switch 202 and window signal 3 with a high-level interval of "symbol period/4" are input. To switch 204, the output signal of switch 203 and window signal 4 with a high-level interval of "symbol period/8" are input. In this way, the number of window signals is the same as the number of symbols of the optimal guard interval length detection signal.

Then, switches 202 to 204 select window signals as shown in the table below.

| Control signal to switch 202 | Control signal to switch 203 | Control signal to switch 204 | Output of switch 204 (window signal selected) |
|---|---|---|---|
| 0 | 0 | 0 | Window signal 1 [symbol period/2] |
| 1 | 0 | 0 | Window signal 2 [3 × symbol period/8] |
| 1 | 1 | 0 | Window signal 3 |

-continued

| Control signal to switch 202 | Control signal to switch 203 | Control signal to switch 204 | Output of switch 204 (window signal selected) |
|---|---|---|---|
| 1 | 1 | 1 | [symbol period/4] Window signal 4 [symbol period/8] |

As shown above, the OFDM transmission/reception apparatus of the present embodiment selects window signals using the decision error of each symbol of the optimal guard interval length detection signal. Then, the OFDM transmission/reception apparatus of the present embodiment can decide the guard interval length by calculating a logical product of the selected window signal (output of switch 204) and a valid symbol.

Logical product calculator 205 calculates the logical product of the output of switch 204 and the output of IDFT circuit 104. In this way, the OFDM transmission/reception apparatus of the present embodiment can extract part of a valid symbol, and thus can generate a guard interval.

Then, P/S converter 206 performs P/S conversion of the guard interval signal, which is the output of logical product calculator 205, and the output signal of IDFT circuit 104. In this way, an IDFT signal with a guard interval inserted is obtained.

Figure 7:
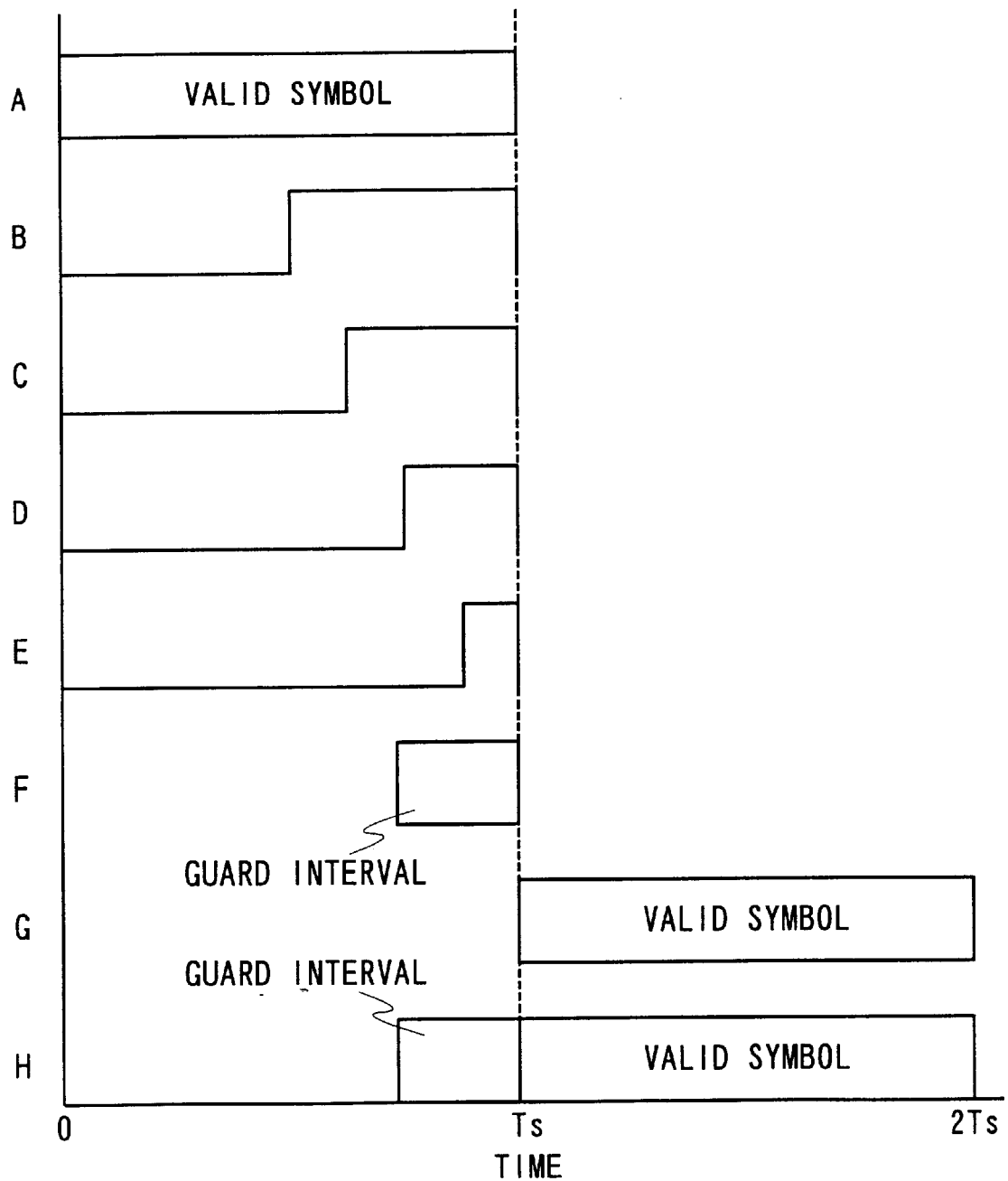
FIG. 7 is a timing chart showing an example of the step of a guard interval inserter of the OFDM transmission/reception apparatus according to Embodiment 1 adding a guard interval.

Here, the step of guard interval inserter 105 generating guard intervals is explained using FIG. 7. FIG. 7 is a timing chart showing an example of the step of the guard interval inserter of the OFDM transmission/reception apparatus of the present embodiment generating guard intervals.

The signal shown at A represents a valid symbol. Likewise, B represents window signal 1; C, window signal 2; D, window signal 3; E, window signal 4; F, guard interval signal; G, valid signal delayed by 1 symbol; and H, IDFT signal after addition of a guard interval.

The OFDM transmission/reception apparatus of the present embodiment selects one of window signals with different high-level interval lengths and finds the logical product of the window signal and the valid symbol. In this way, the OFDM transmission/reception apparatus of the present embodiment can set the same number of guard interval lengths as the number of window signals.

For example, the guard interval signal shown at F is generated as follows. That is, the OFDM transmission/reception apparatus of the present embodiment calculates the logical product of the valid symbol shown at A and window signal 3 shown at D to extract the symbol with the same length as the high-level interval of window signal 3 shown at D from the last part of valid symbol A. In this way, the guard interval signal shown at F is generated.

As shown above, the OFDM transmission/reception apparatus of the present embodiment selects a window signal with a different high-level interval length every time an optimal guard interval length detection signal inserted into a transmission signal is received. Then, the OFDM transmission/reception apparatus of the present embodiment calculates the logical product of the selected window signal and valid symbol to generate a guard interval according to the channel quality. In this way, the OFDM transmission/reception apparatus of the present embodiment can expand/contract a guard interval length according to the channel quality.

Then, the operation of the reception system of the OFDM transmission/reception apparatus of the present embodiment is explained using FIG. 5.

The reception signal input to the reception system is converted to a digital signal by A/D converter 107.

The OFDM transmission/reception apparatus of the present embodiment calculates a correlation between a pre-DFT signal and the pre-DFT signal delayed by a valid symbol length. The OFDM transmission/reception apparatus of the present embodiment detects the integration interval of DFT by detecting the timing at which the correlation result becomes largest. More specifically, delayer 108 delays the reception signal by the valid symbol length, then correlator 109 calculates a correlation and timing generator 110 detects the timing at which the correlation result becomes largest. Guard interval eliminator 111 eliminates the guard interval from the reception signal according to this detection result.

The reception signal stripped of the guard interval is DFT-processed by DFT circuit 112. This results in 4 baseband signals, which are carried by 4 carriers. The 4 baseband signals are subjected to coherent detection by coherent detectors 113 to 116, respectively. In this way, coherent detected signals are obtained. Here, a delay detection system can also be used as the demodulation system.

The coherent detected signals obtained by coherent detectors 113 to 116 are judged by Deciders 117 to 120. The 4 signals judged by Deciders 117 to 120 are converted to a serial signal by P/S converter 124. In this way, a demodulated signal is obtained.

On the other hand, switch 121 selects only the optimal guard interval length selection control signal from the output signal of Decider 120 and outputs it to guard interval inserter 105.

Subtractor 122 carries out a subtraction between the signal input to Decider 117 and the signal output from Decider 117 to calculate the decision error. Here, this decision error is determined as the channel quality. Optimal guard interval length detector 123 generates an optimal guard interval length selection control signal using the decision error calculated by subtractor 122, that is, channel quality information.

Figure 8:
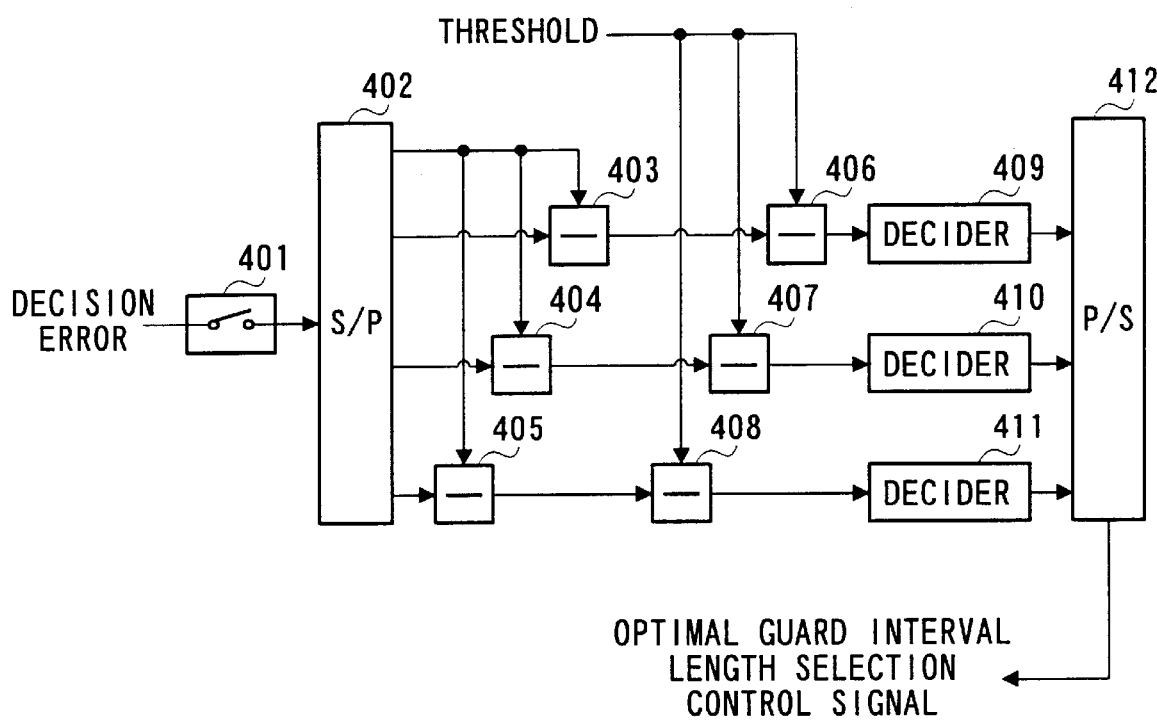
FIG. 8 is a block diagram showing an outlined configuration of an optimal guard interval length detector of the OFDM transmission/reception apparatus according to Embodiment 1.

Here, the optimal guard interval length detector of the OFDM transmission/reception apparatus of the present embodiment is explained using FIG. 8. FIG. 8 is a block diagram showing an outlined configuration of the optimal guard interval length detector of the OFDM transmission/reception apparatus of the present embodiment.

The decision error input to optimal guard interval length detector 123 is selectively output by switch 401 and S/P-converted by S/P converter 402.

Subtractor 403 calculates a subtraction between the first output of S/P converter 402 and the second output of S/P converter 402. Likewise, subtractor 404 calculates a subtraction between the first output and the third output, and subtractor 405 calculates a subtraction between the first output and the fourth output.

In this way, optimal guard interval length detector 123 finds a difference between the decision error of the symbol indicating the longest guard interval length (here, decision error of the symbol indicating "symbol period/2" which is the first output of S/P converter 402) and the decision error of another symbol.

Furthermore, subtractor 406 calculates a subtraction between the output of subtractor 403 and a threshold. Likewise, subtractor 407 calculates a subtraction between the output of subtractor 404 and the threshold, and subtractor 408 calculates a subtraction between the output of subtractor 405 and the threshold. Then, Deciders 409 to 411 judge the outputs of subtractors 406 to 408.

As shown above, decision errors are compared with thresholds. Then, guard interval inserter 105 inserts the guard interval with the shortest guard interval of the guard intervals indicated by the symbols producing decision errors less than the threshold into the transmission signal.

That is, Deciders 409 to 411 output a high level (1, for example) in the case that the decision error is not less than the threshold (that is, the channel quality is good) and output a low level (0, for example) in the case that the decision error is less than the threshold. Then, the outputs of Deciders 409 to 411 are P/S-converted by P/S converter 412 to become an optimal guard interval length selection control signal. This optimal guard interval length selection control signal is included in the transmission signal and transmitted.

The received optimal guard interval length selection control signal is S/P-converted to control signals for switches 202 to 204 by S/P converter 201. That is, the outputs of Deciders 409 to 411 become control signals for switches 202 to 204. The guard interval insertion procedure hereafter is as already described.

As shown above, the OFDM transmission/reception apparatus of the present embodiment detects the reception condition of each symbol of an optimal guard interval length detection signal and decides up to which of the 4 symbols have been received. This allows the OFDM transmission/reception apparatus of the present embodiment to detect the minimum necessary guard interval length to eliminate delayed signals, making it possible to change the guard interval to an appropriate length suitably.

The length of a guard interval to be added to each symbol should be longer than the maximum delay time of a delayed signal assumed in an environment in which the OFDM transmission/reception apparatus of the present embodiment is used. However, such a delayed signal with the maximum delay time assumed does not always exist. Therefore, as described above, the OFDM transmission/reception apparatus of the present embodiment can improve the transmission efficiency without deteriorating the error rate characteristic by adaptively changing the length of guard intervals to prevent any guard interval that is longer than required from being provided.

As shown above, the OFDM transmission/reception apparatus of the present embodiment can improve the transmission efficiency by adaptively changing the length of guard intervals.

The present embodiment is explained assuming that the number of carriers is 4, but the number of carriers can be increased to 8, 16, 32, and 64, and so on with an apparatus configuration similar to the configuration above.

In the present embodiment, the types of window signals are not limited to the 4 types above, but any number of window signals with a predetermined high-level intervals can be set.

Furthermore, in the present embodiment, FFT (Fast Fourier Transform) and IFFT (Inverse Fast Fourier Transform) can also be used instead of DFT and IDFT. Similar effects can be achieved in such cases, too.

Embodiment 2

The OFDM transmission/reception apparatus of Embodiment 2 of the present invention has the same configuration as that of the OFDM transmission/reception apparatus of Embodiment 1 and uses symbols of optimal guard interval length detection signals of a plurality of bursts.

Figure 9:
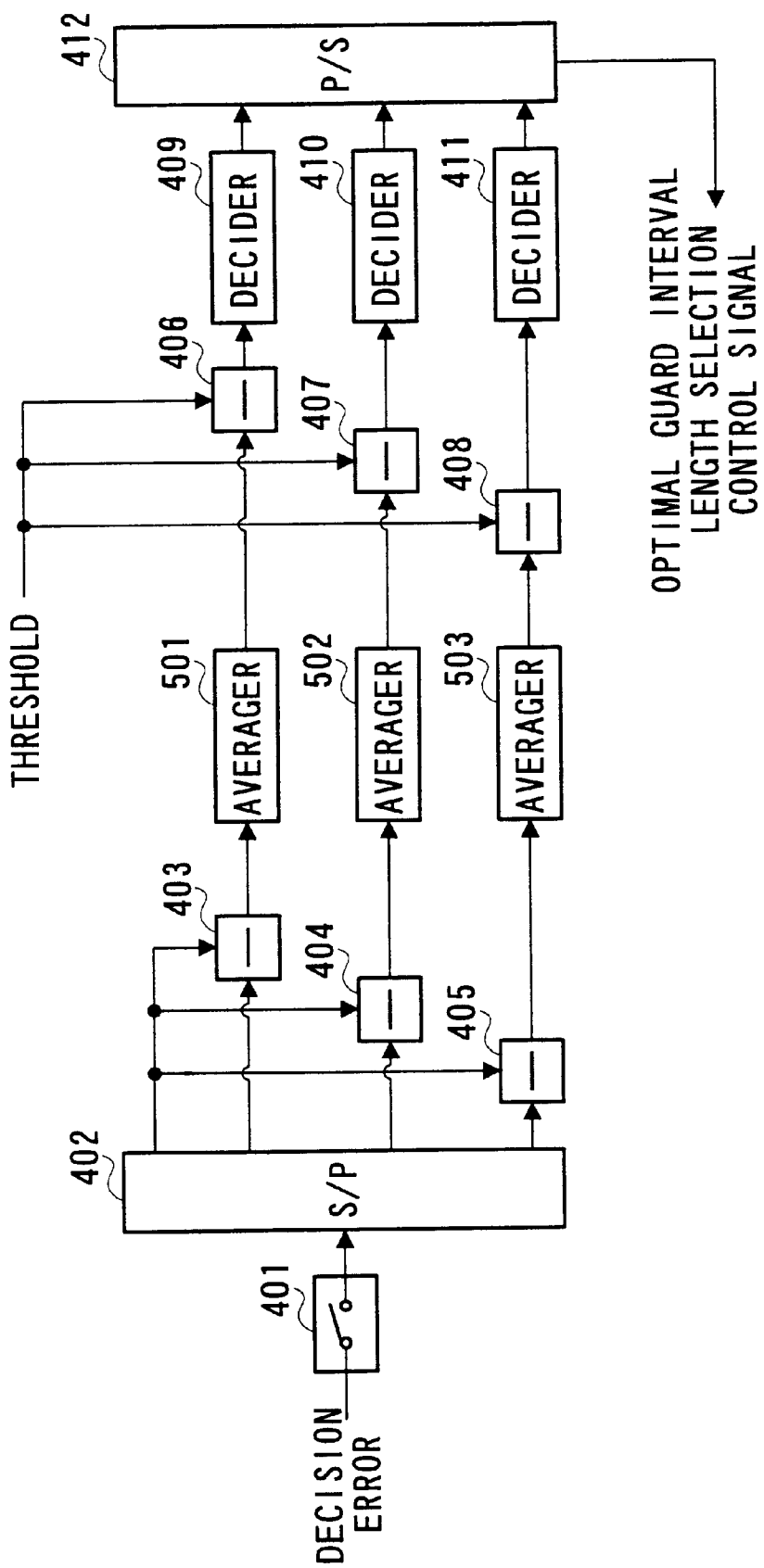
FIG. 9 is a block diagram showing an outlined configuration of an optimal guard interval length detector of an OFDM transmission/reception apparatus according to Embodiment 2 of the present invention.

The optimal guard interval length detector of the OFDM transmission/reception apparatus of the present embodiment is explained below using FIG. 9. FIG. 9 is a block diagram showing an outlined configuration of the optimal guard interval length detector of the OFDM transmission/reception apparatus of Embodiment 2 of the present invention. The parts with the same configuration as that of Embodiment 1 are assigned the same numbers and their detailed explanations are omitted.

Averagers 501 to 503 perform averaging on the outputs of subtractors 403 to 405.

In this way, the optimal guard interval length detector performs averaging using symbols of optimal guard interval length detection signals of a plurality of bursts. Therefore, the OFDM transmission/reception apparatus of the present embodiment can achieve higher accuracy of an optimal guard interval length selection control signal than that of the OFDM transmission/reception apparatus of Embodiment 1.

Embodiment 3

The OFDM transmission/reception apparatus of Embodiment 3 of the present invention has the same configuration as that of the OFDM transmission/reception apparatus of Embodiment 1 and inserts symbols for optimal guard interval length detection signals into a plurality of carriers.

Figure 10:
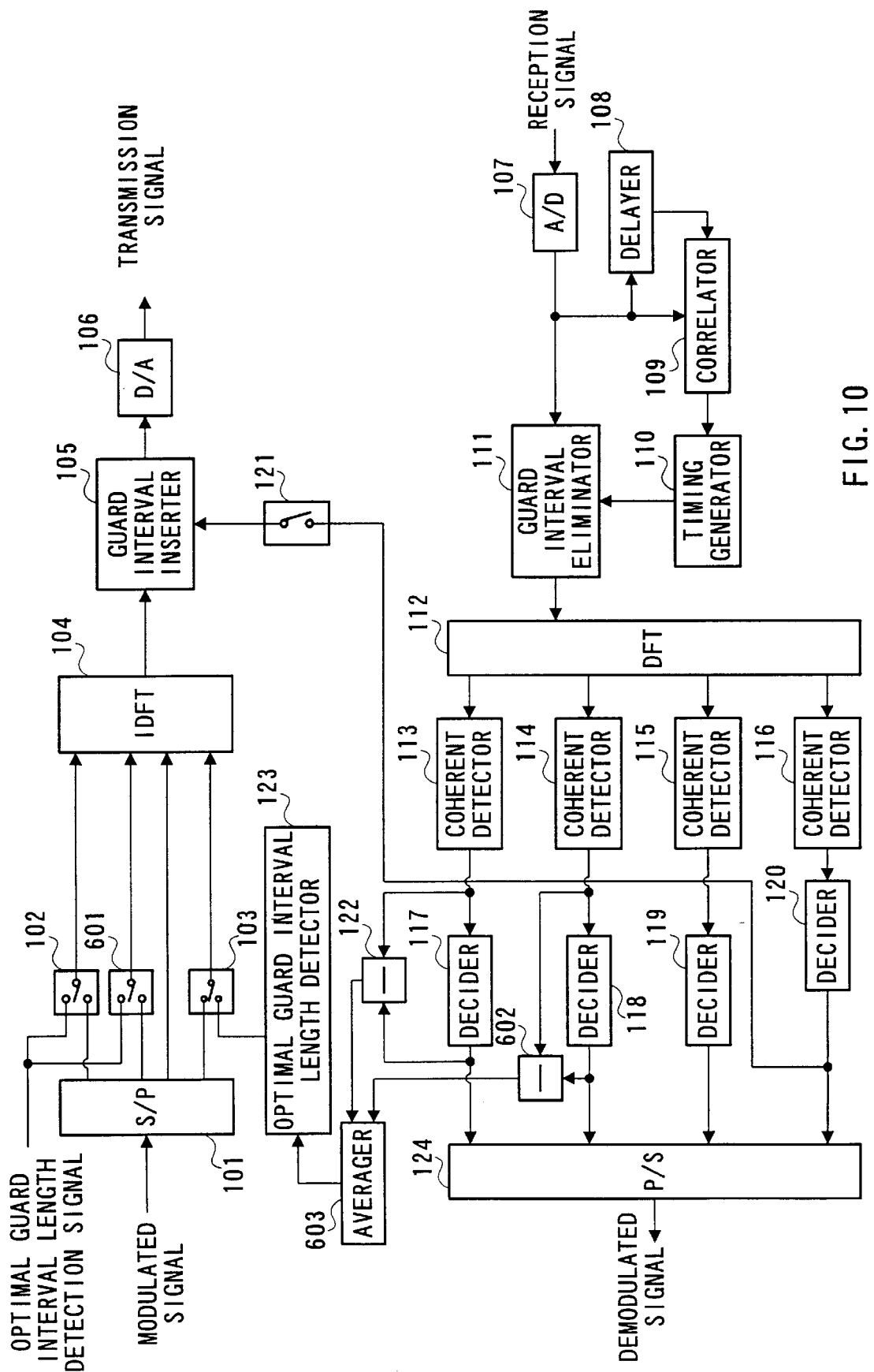
FIG. 10 is a block diagram showing an outlined configuration of an optimal guard interval length detector of an OFDM transmission/reception apparatus according to Embodiment 3 of the present invention.

The optimal guard interval length detector of the OFDM transmission/reception apparatus of the present embodiment is explained below using FIG. 10. FIG. 10 is a block diagram showing an outlined configuration of the optimal guard interval length detector of the OFDM transmission/reception apparatus of Embodiment 3 of the present invention. The parts with the same configuration as that of Embodiment 1 are assigned the same numbers and their detailed explanations are omitted.

The transmission system of the OFDM transmission/reception apparatus of the present embodiment has switch 601. With switch 601, an optimal guard interval length detection signal is inserted into not only carrier 1 but also carrier 2.

Furthermore, the reception system of the OFDM transmission/reception apparatus of the present embodiment also has subtractor 602 and Averager 603. Subtractor 602 calculates the decision error of carrier 2. Averager 603 calculates the average of decision errors of carrier 1 and carrier 2. Averager 603 outputs the average value of the decision errors to optimal guard interval length detector 123.

As shown above, the OFDM transmission/reception apparatus of the present embodiment inserts an optimal guard interval length detection signal into a plurality of carriers and generates an optimal guard interval length selection control signal using the average value of decision errors. This allows the OFDM transmission/reception apparatus of the present embodiment to achieve higher accuracy of optimal guard interval length selection control signal than that of the OFDM transmission/reception apparatuses of Embodiments 1 and 2.

Embodiment 4

The OFDM transmission/reception apparatus of Embodiment 4 of the present invention has the same configuration as that of the OFDM transmission/reception apparatus of Embodiment 3, but does not average optimal guard interval length detection signals before they are input to the optimal guard interval length detector and performs a logical product calculation on the optimal guard interval length detection signals using the optimal guard interval length detector.

Figure 11:
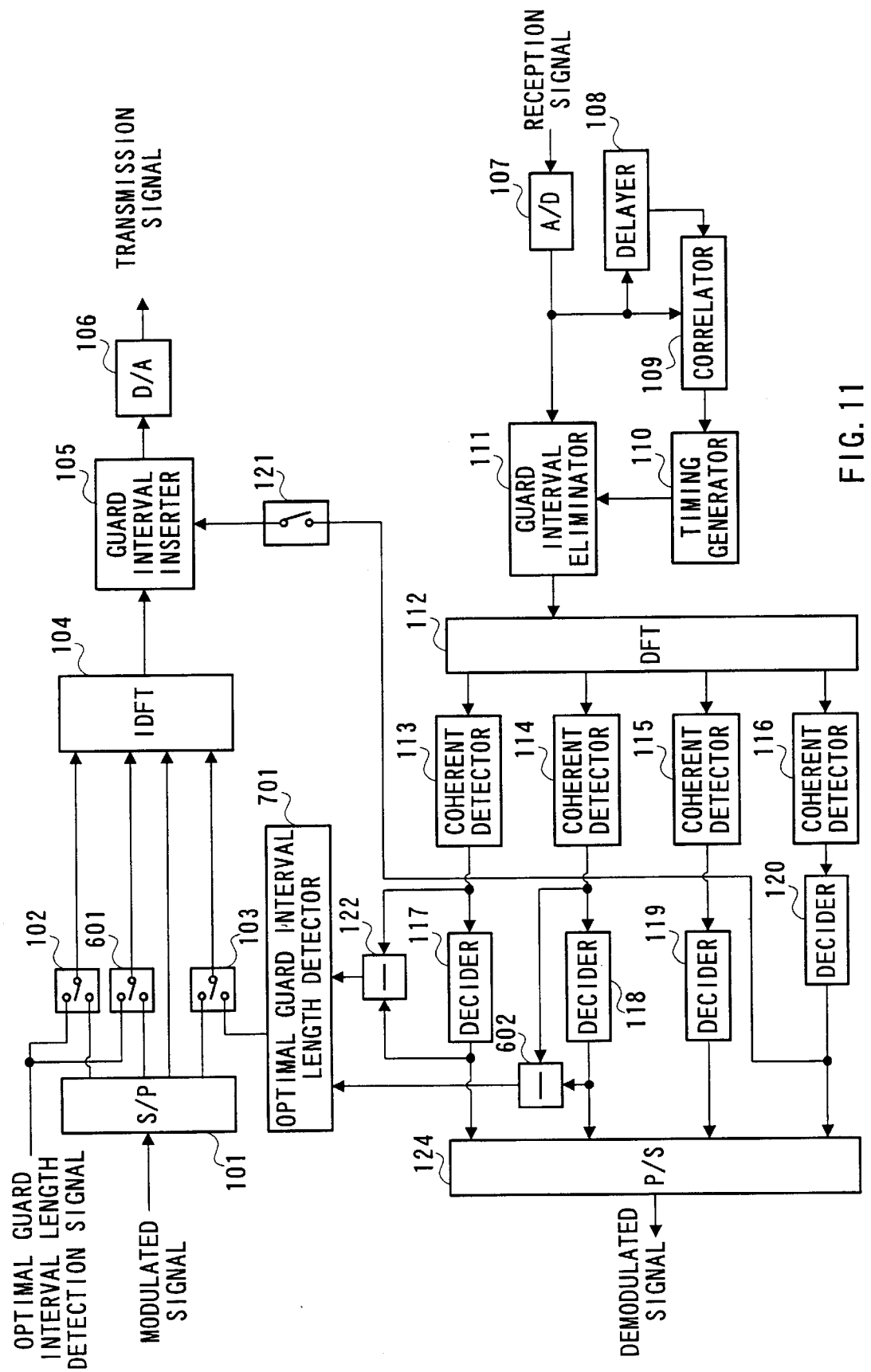
FIG. 11 is a block diagram showing an outlined configuration of an OFDM transmission/reception apparatus according to Embodiment 4 of the present invention.
Figure 12:
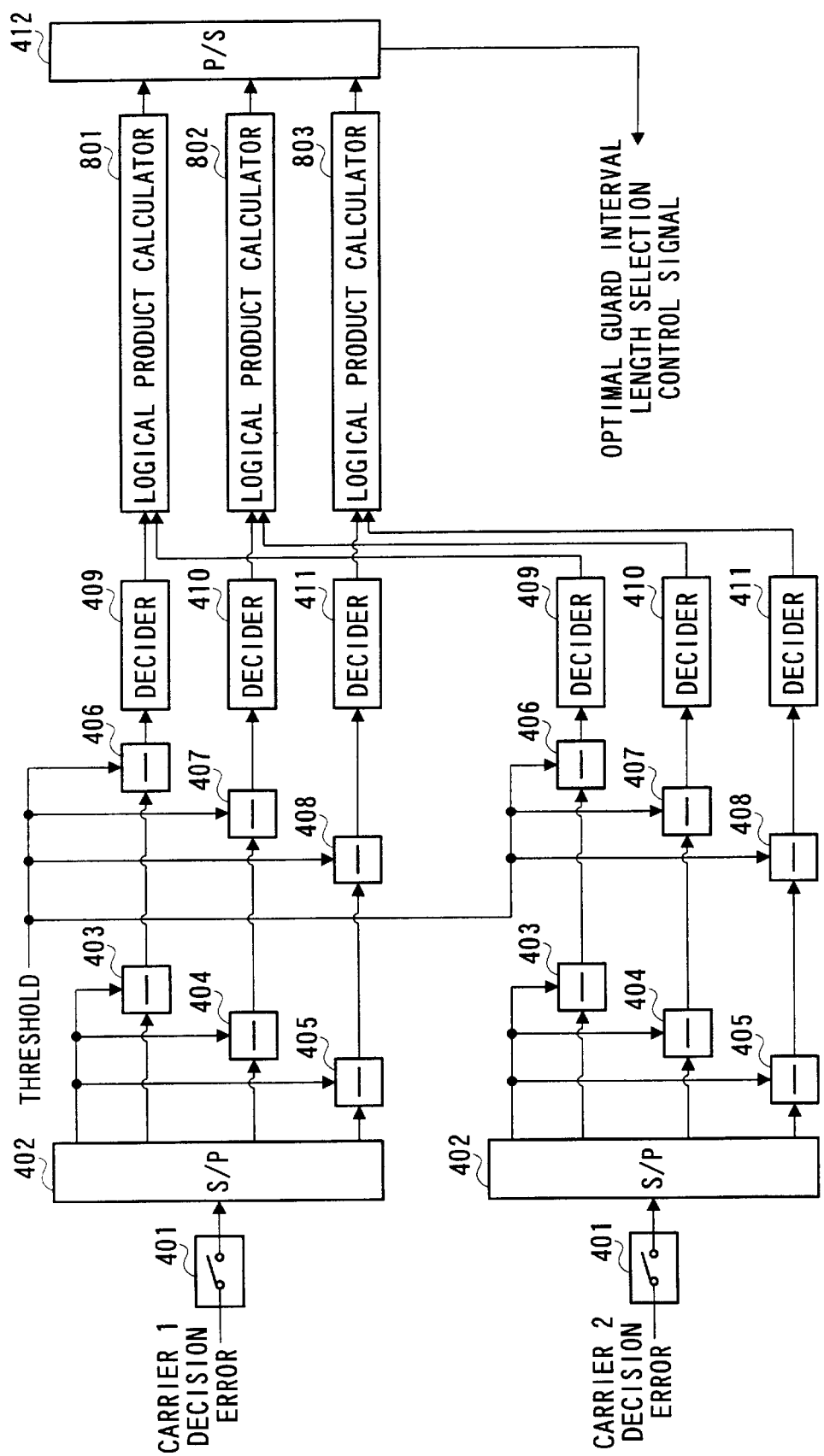
FIG. 12 is a block diagram showing an outlined configuration of an optimal guard interval length detector of the OFDM transmission/reception apparatus according to Embodiment 4.

The optimal guard interval length detector of the OFDM transmission/reception apparatus of the present embodiment is explained below using FIG. 11 and FIG. 12. FIG. 11 is a block diagram showing an outlined configuration of the OFDM transmission/reception apparatus of Embodiment 4 of the present invention. FIG. 12 is a block diagram showing an outlined configuration of the optimal guard interval length detector of the OFDM transmission/reception apparatus of Embodiment 4 of the present invention. The parts with the same configuration as that of Embodiments 1 and 3 are assigned the same numbers and their detailed explanations are omitted.

As shown in FIG. 11, the OFDM transmission/reception apparatus of the present embodiment does not average the decision errors of carrier 1 and carrier 2, and inputs the decision errors of carrier 1 and carrier 2 to optimal guard interval length detector 701.

Then, as shown in FIG. 12, logical product calculators 801 to 803 perform a logical product calculation on the outputs of Deciders 409 to 411 for carrier 1 and the outputs of Deciders 409 to 411 for carrier 2.

As shown above, the OFDM transmission/reception apparatus of the present embodiment can achieve higher accuracy of an optimal guard interval length selection control signal by selecting a guard interval length whose difference between decision errors falls below a threshold as the optimal guard interval length in all carriers into which symbols for optimal guard interval detection have been inserted.

Embodiment 5

The OFDM transmission/reception apparatus of Embodiment 5 of the present invention has the same configuration as that of the OFDM transmission/reception apparatus of Embodiment 3 but does not use carriers whose reception level falls below a threshold to detect the optimal guard interval length.

Figure 13:
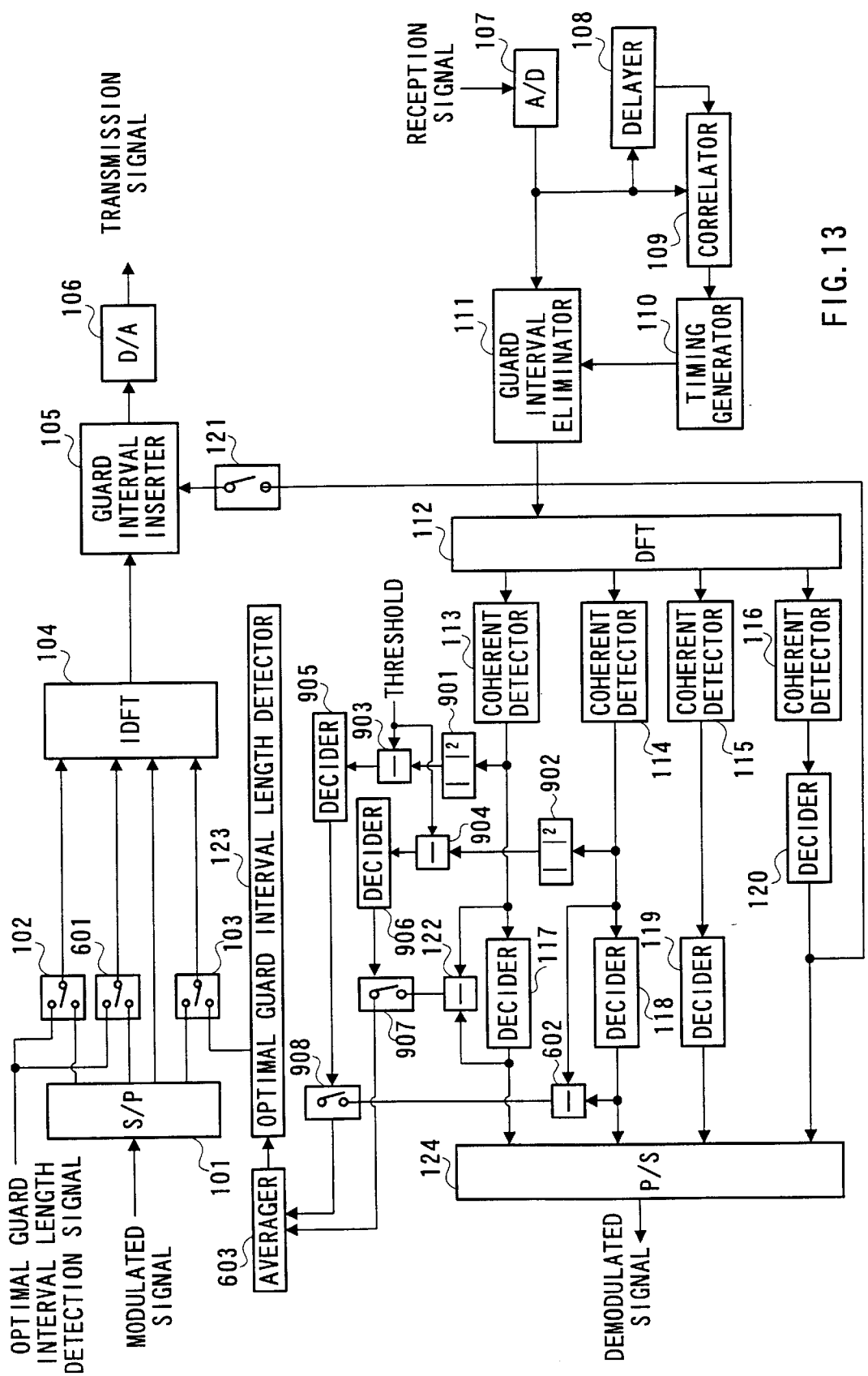
FIG. 13 is a block diagram showing an outlined configuration of an OFDM transmission/reception apparatus according to Embodiment 5 of the present invention.

The optimal guard interval length detector of the OFDM transmission/reception apparatus of the present embodiment is explained below using FIG. 13. FIG. 13 is a block diagram showing an outlined configuration of the OFDM transmission/reception apparatus of Embodiment 5 of the present invention. The parts with the same configuration as that of Embodiments 1 and 3 are assigned the same numbers and their detailed explanations are omitted.

Square sum calculator 901 calculates the sum of squares of coherent detected signals of carrier 1. Square sum calculator 902 calculates the sum of squares of coherent detected signals of carrier 2.

Then, subtractor 903 carries out a subtraction between the output of square sum calculator 901 and a threshold and Decider 905 decides which is larger/smaller based on the subtraction result. Subtractor 904 carries out a subtraction between the output of square sum calculator 902 and the threshold and Decider 906 decides which is larger/smaller based on the subtraction result.

Switches 907 and 908 are controlled by Deciders 905 and 906, respectively. In the case that the reception levels of their respective carriers (that is, the outputs of square sum calculators 901 and 902) are less than the threshold, switches 907 and 908 do not output the decision errors of the carriers to Averager 603.

As shown above, based on the fact that the reception levels vary for each carrier in a frequency selection fading environment, the OFDM transmission/reception apparatus of the present embodiment assumes that the carrier whose reception level falls below the threshold does not have good channel quality and does not use the carrier whose reception level falls below the threshold for detection of the optimal guard interval length. This allows the OFDM transmission/reception apparatus of the present embodiment to achieve higher accuracy of optimal guard interval length selection control signals.

Embodiment 6

The OFDM transmission/reception apparatus of Embodiment 6 of the present invention has the same configuration as that of the OFDM transmission/reception apparatus of Embodiment 5 and has a level detector with a simple configuration instead of the square sum calculator.

The present embodiment describes a case where the input signal is a QPSK-modulated signal and the known reference signal is a pilot symbol.

The level detector of the present embodiment finds envelope information from the absolute values of the I component and Q component by approximate calculation and detects the reception level.

Envelope information Z can be obtained from $Z=\sqrt{(|I|^2+|Q|^2)}$. However, obtaining a square sum from $\sqrt{(|I|^2+|Q|^2)}$ requires a relatively great amount of calculation. Therefore, to reduce the amount of calculation to a minimum, it is possible to find a square sum by approximate calculation using approximate expression $Z=|I|+|Q|$. However, in the case that this approximate expression is used, the square sum becomes a maximum (when phase is 45°) of 1.414 times the value calculate by $\sqrt{(|I|^2+|Q|^2)}$. That is, an error of a maximum of approximately 41% will result, deteriorating the error rate characteristic.

Therefore, the OFDM transmission/reception apparatus of the present embodiment uses an approximate expression using a simple multiplication by a bit shift. That is, the OFDM transmission/reception apparatus of the present embodiment uses $Z=|I|+0.375\times|Q|$ when $|I|>|Q|$ and $Z=|Q|+0.375\times|I|$ when $|Q|>|I|$ as an approximate expression.

Figure 14:
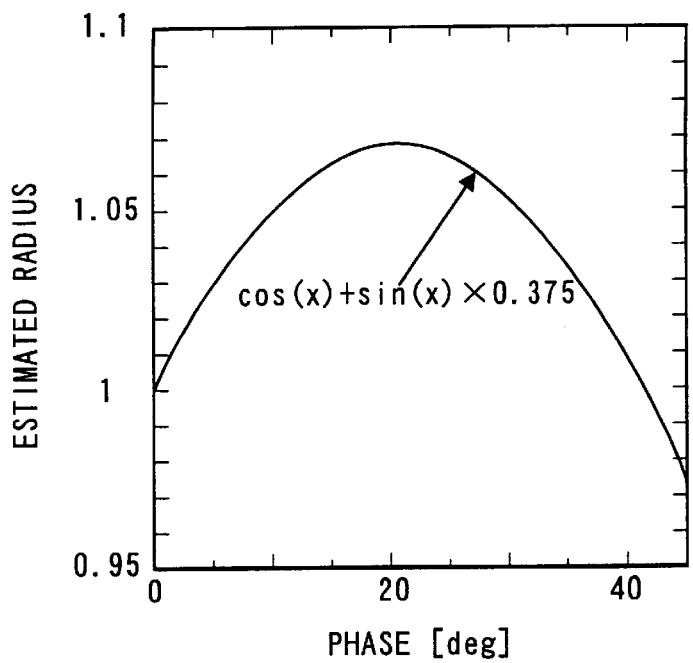
FIG. 14 is a graph showing a theoretical calculation result of an envelope information calculation approximate expression used in a level detector of an OFDM transmission/reception apparatus according to Embodiment 6 of the present invention.

FIG. 14 is a graph showing the result of a theoretical calculation of the relationship between phase θ and estimated radius (that is amplitude) when $|I|>|Q|$ ( that is, range of $0\leq\theta\leq 45°$) From this graph, it is clearly seen that using the above approximate expression makes it possible to obtain envelope information with an error within 7% of the case obtained with a square sum.

Then, the level detector of the OFDM transmission/reception apparatus of the present embodiment obtains envelope information using the above approximate expression and detects the reception level.

Figure 15:
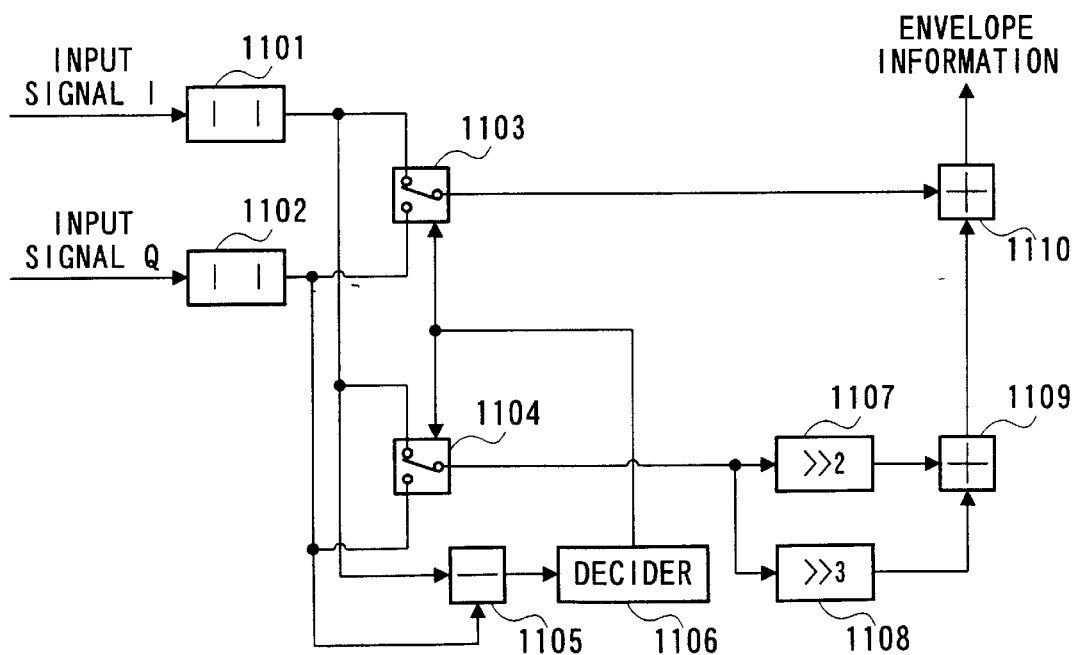
FIG. 15 is a block diagram showing an outlined configuration of a level detector of the OFDM transmission/reception apparatus according to Embodiment 6.

The level detector of the OFDM transmission/reception apparatus of the present embodiment is explained using FIG. 15. FIG. 15 is a block diagram showing an outlined configuration of the level detector of the OFDM transmission/reception apparatus of Embodiment 6.

The I component and Q component of one carrier after coherent detection processing are input to absolute value detectors 1101 and 1102. Absolute value detectors 1101 and 1102 calculate the absolute values of input signals and outputs the absolute values to subtractor 1105 and adder 1110. The I component or Q component is selected by switches 1103 and 1104. The subtraction result from subtractor 1105 is judged by Decider 1106. The decision results are used to control switches 1103 and 1104.

2-bit shifter 1107 and 3-bit shifter 1108 shift the output of switch 1104 by 2 bits and 3 bits, respectively. The outputs of 2-bit shifter 1107 and 3-bit shifter 1108 are added up by adder 1109. This allows multiplication processing of 0.375 in the above approximate expression to be performed. Adder 1110 adds up the output of switch 1103 and the output of adder 1109 and outputs envelope information.

Then, the operation of the level detector of the OFDM transmission/reception apparatus of the present embodiment is explained.

The absolute values of the I component and Q component are calculated by absolute value detectors 1101 and 1102, respectively. In this way, absolute values |I| and |Q| are obtained.

Then, subtractor 1105 performs a subtraction between the outputs of absolute value detectors 1101 and 1102 (|I| and |Q|). Decider 1106 decides which is larger/smaller based on the subtraction result. The outputs of absolute value detectors 1101 and 1102 (|I| and |Q|) are selected by switches 1103 and 1104, respectively and output. Switches 1103 and 1104 select the signal to be output according to the decision result of Decider 1106.

When the output of Decider 1106 indicates |I|>|Q| switch 1103 outputs |I|. When the output of Decider 1106 indicates |Q|>|I|, switch 1103 outputs |Q|. Furthermore, when the output of Decider 1106 indicates |I|>|Q|, switch 1104 outputs |Q|. When the output of Decider 1106 indicates |Q|>|I|, switch 1104 outputs |I|. In short, switch 1103 outputs |I| or |Q| whichever is greater and switch 1104 outputs |I| or |Q|, whichever is smaller.

The smaller one of |I| or |Q| output from switch 1104 is shifted by 2 bits and 3 bits by 2-bit shifter 1107 and 3-bit shifter 1108, respectively.

Since a 1-bit shift reduces the amplitude to half, the amplitude becomes 0.25 times with a 2-bit shift and 0.125 times with a 3-bit shift. Therefore, the amplitude of the output signal of 2-bit shifter 1107 becomes 0.25 times the amplitude of the output signal of switch 1104. The amplitude of the output signal of 3-bit shifter 1108 becomes 0.125 times the amplitude of the output signal of switch 1104.

Then, adder 1109 adds up the output signal of 2-bit shifter 1107 (0.25×|I| or 0.25×|Q|) and the output signal of 3-bit shifter 1108 (0.125×|I| or 0.125×|Q|). Therefore, the output signal of adder 1109 becomes 0.375×|I| or 0.375×|Q|.

Then, adder 1110 adds up the output signal of switch 1103 (|I| or |Q|) and the output signal of adder 1109 (0.375×|I| or 0.375×|Q|). From this, envelope information Z is obtained from the approximate expression above.

As shown above, the level detector of the OFDM transmission/reception apparatus of the present embodiment detects the reception level by finding an envelope, and thus it does not perform a multiplication unlike the square sum calculator of Embodiment 5. Therefore, the OFDM transmission/reception apparatus of the present embodiment has a simpler configuration, making it possible to reduce the necessary amount of calculation.

Moreover, the OFDM transmission/reception apparatus of the present embodiment can further reduce the necessary amount of calculation in calculating an envelope by using an approximate expression only consisting of simple multiplications and additions, which can be implemented by bit shifts on the circuit.

The present embodiment describes the case where the input signal is a QPSK-modulated signal. However, the above apparatus configuration is also applicable to any other cases where other modulation systems are used so long as the input signal can be separated into the I component and Q component.

Embodiment 7

The OFDM transmission/reception apparatus of Embodiment 7 of the present invention has the same configuration as that of the OFDM transmission/reception apparatus of Embodiment 1 and uses a known symbol as the optimal guard interval length detection signal.

Figure 16:
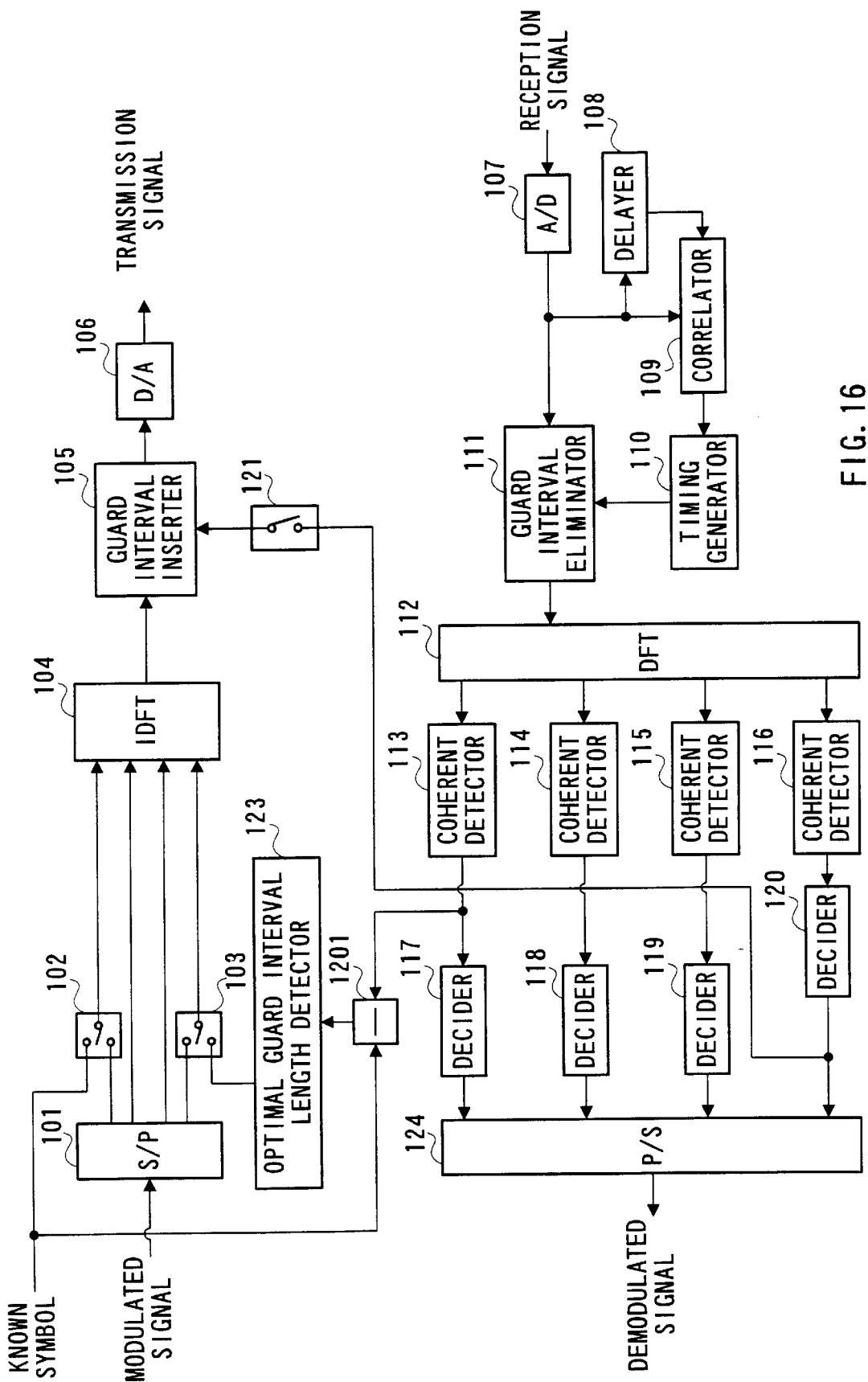
FIG. 16 is a block diagram showing an outlined configuration of an OFDM transmission/reception apparatus according to Embodiment 7 of the present invention.

The OFDM transmission/reception apparatus of the present embodiment is explained below using FIG. 16. FIG. 16 is a block diagram showing an outlined configuration of the OFDM transmission/reception apparatus of Embodiment 7 of the present invention. The parts with the same configuration as that of Embodiment 1 are assigned the same numbers and their detailed explanations are omitted.

As shown in FIG. 16, the OFDM transmission/reception apparatus of the present embodiment uses a known symbol as the optimal guard interval length detection signal. Subtractor 1201 performs a subtraction between the carrier 1 signal prior to its input to Decider 117 and a known symbol and outputs the difference between these two to optimal guard interval length detector 123.

Thus, the OFDM transmission/reception apparatus of the present embodiment uses a known symbol as the optimal guard interval length detection signal, therefore can improve the accuracy of the optimal guard interval length selection control signal.

Embodiment 8

The OFDM transmission/reception apparatus of Embodiment 8 of the present invention has the same configuration as that of the OFDM transmission/reception apparatus of Embodiment 1 and uses a variable threshold to be used in the optimal guard interval length detector.

Figure 17:
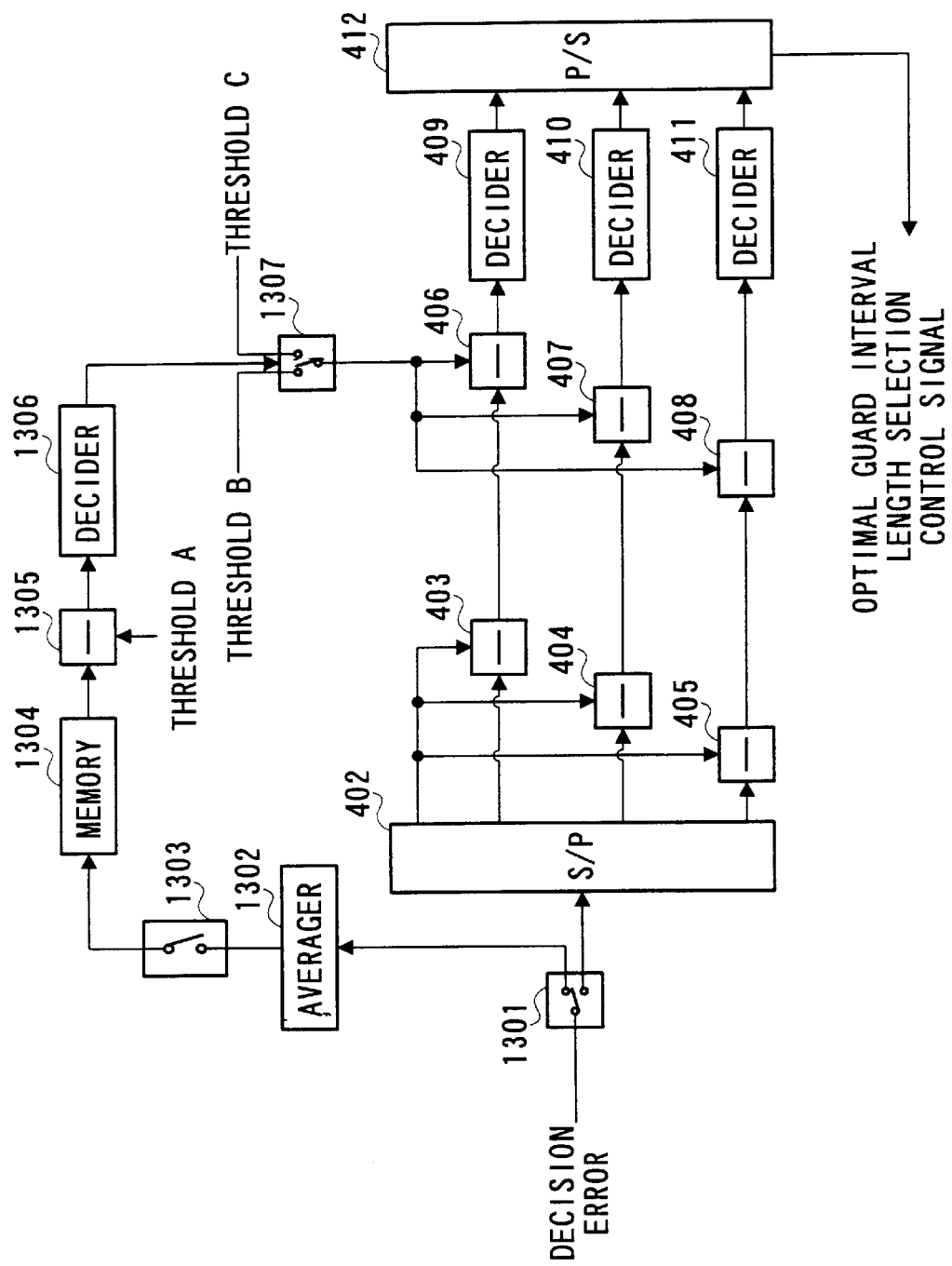
FIG. 17 is a block diagram showing an outlined configuration of an optimal guard interval length detector of an OFDM transmission/reception apparatus according to Embodiment 8 of the present invention.

The OFDM transmission/reception apparatus of the present embodiment is explained below using FIG. 17. FIG. 17 is a block diagram showing an outlined configuration of the optimal guard interval length detector of the OFDM transmission/reception apparatus of Embodiment 8 of the present invention. The parts with the same configuration as that of Embodiment 1 are assigned the same numbers and their detailed explanations are omitted.

Switch 1301 selects an input decision error and outputs it to S/P converter 402 and Averager 1302. The previous burst channel quality information is stored in memory 1304 by the switching of switch 1303.

The channel quality information stored in memory 1304 is subjected to a subtraction with threshold A by subtractor 1305. Decider 1306 decides which is larger/smaller based on the subtraction result. Switch 1307 is controlled by the decision result of Decider 1306 and outputs either threshold B or threshold C. Here, suppose threshold B>threshold C.

As shown above, considering the possibility that if, for example, the channel quality is bad, variations in the decision error will increase and a longer guard interval length than the optimal guard interval length will be selected, the OFDM transmission/reception apparatus of the present embodiment can improve the accuracy of the optimal guard interval length selection control signal by changing the threshold to a greater value in the case that the decision error information stored in memory exceeds the threshold.

Embodiment 9

The OFDM transmission/reception apparatus of Embodiment 9 of the present invention has the same configuration as that of the OFDM transmission/reception apparatus of Embodiment 1, and selects a guard interval length in which a difference between decision errors falls below a threshold in a plurality of bursts as the optimal guard interval length.

Figure 18:
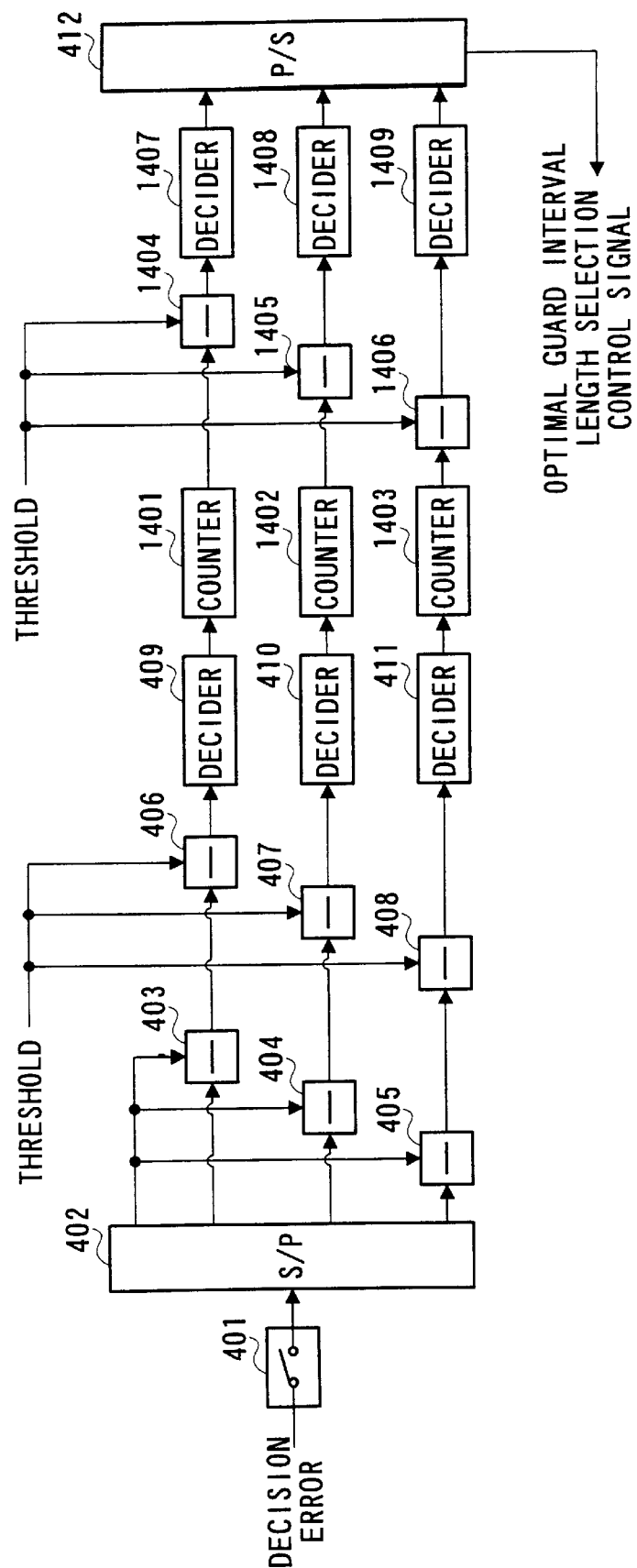
FIG. 18 is a block diagram showing an outlined configuration of an optimal guard interval length detector of an OFDM transmission/reception apparatus according to Embodiment 9 of the present invention.

The OFDM transmission/reception apparatus of the present embodiment is explained below using FIG. 18. FIG. 18 is a block diagram showing an outlined configuration of the optimal guard interval length detector of the OFDM transmission/reception apparatus of Embodiment 9 of the present invention. The parts with the same configuration as that of Embodiment 1 are assigned the same numbers and their detailed explanations are omitted.

In FIG. 18, counters 1401 to 1403 output the outputs of Deciders 409 to 411 for every a plurality of bursts. Subtractors 1404 to 1406 perform a subtraction between the outputs of counters 1401 to 1403 and a threshold. Deciders 1407 to 1409 decide which is larger/smaller based on the subtraction results.

Thus, the OFDM transmission/reception apparatus of the present embodiment selects a guard interval length in which a difference between decision errors falls below a threshold in a plurality of bursts as the optimal guard interval length, thus improving the accuracy of the optimal guard interval length selection control signal.

Embodiment 10

The OFDM transmission/reception apparatus of Embodiment 10 of the present invention has the same configuration as that of the OFDM transmission/reception apparatus of Embodiment 1, and sets the maximum guard interval length in the case that the channel quality of the carrier into which an optimal guard interval length selection control signal is inserted falls below a threshold.

Figure 19:
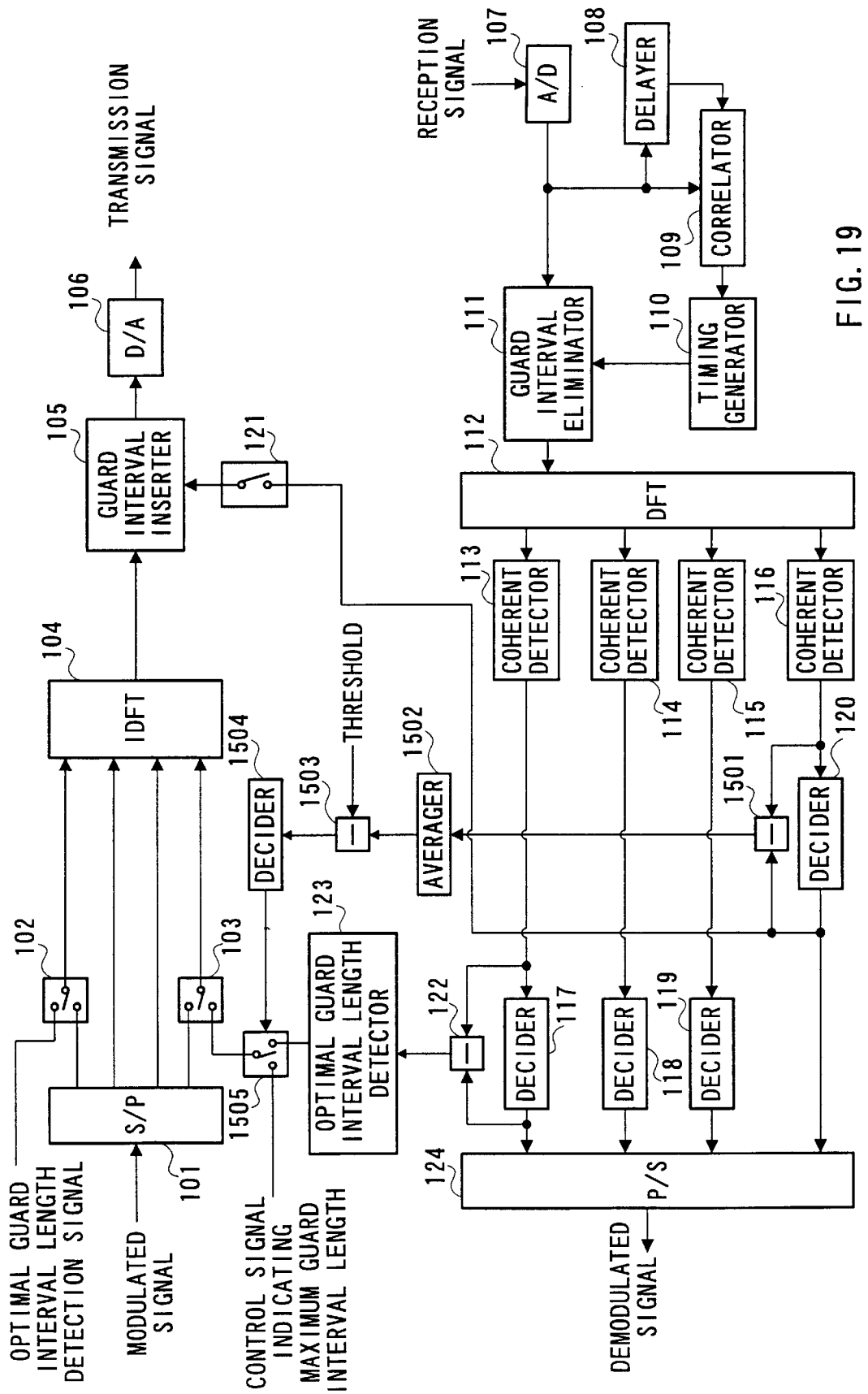
FIG. 19 is a block diagram showing an outlined configuration of an OFDM transmission/reception apparatus according to Embodiment 10 of the present invention.

The OFDM transmission/reception apparatus of the present embodiment is explained below using FIG. 19. FIG. 19 is a block diagram showing an outlined configuration of the OFDM transmission/reception apparatus of Embodiment 9 of the present invention. The parts with the same configuration as that of Embodiment 1 are assigned the same numbers and their detailed explanations are omitted.

In FIG. 19, subtractor 1501 performs a subtraction on the carrier into which an optimal guard interval length selection control signal is inserted (here carrier 4) between the signal before being input to Decider 120 and the output signal from Decider 120. That is, subtractor 1501 calculates a decision error of carrier 4.

Then, the decision error of carrier 4 is averaged by Averager 1502. Subtractor 1503 performs a subtraction between the averaged decision error and a threshold. Decider 1504 decides which is larger/smaller based on the subtraction result. Switch 1505 is controlled by the decision result of Decider 1504 and selects either the output of optimal guard interval length detector 123 or the control signal indicating the maximum guard interval and outputs it to switch 103.

Thus, the OFDM transmission/reception apparatus of the present embodiment sets the maximum guard interval length in the case that the channel quality of the carrier into which an optimal guard interval length selection control signal is inserted falls below a threshold. Thus, in the case that an error exists in the optimal guard interval length selection control signal after demodulation, the OFDM transmission/reception apparatus of the present embodiment can prevent the optimal guard interval length from failing to be set, and thus prevent the error rate characteristic from deteriorating.

By the way, the OFDM transmission/reception apparatus of the present embodiment can also achieve the same effect as that described above in the case that it performs error detection on the carrier into which the optimal guard interval length selection control signal is inserted and set the maximum guard interval length when an error is detected.

Embodiment 11

The OFDM transmission/reception apparatus of Embodiment 11 of the present invention has the same configuration as that of the OFDM transmission/reception apparatus of Embodiment 1, and eliminates the need for transmission/reception of a control signal about the guard interval length by transmitting a signal using the optimal guard interval length detected from a reception signal in both radio stations carrying out a radio communication.

Figure 20:
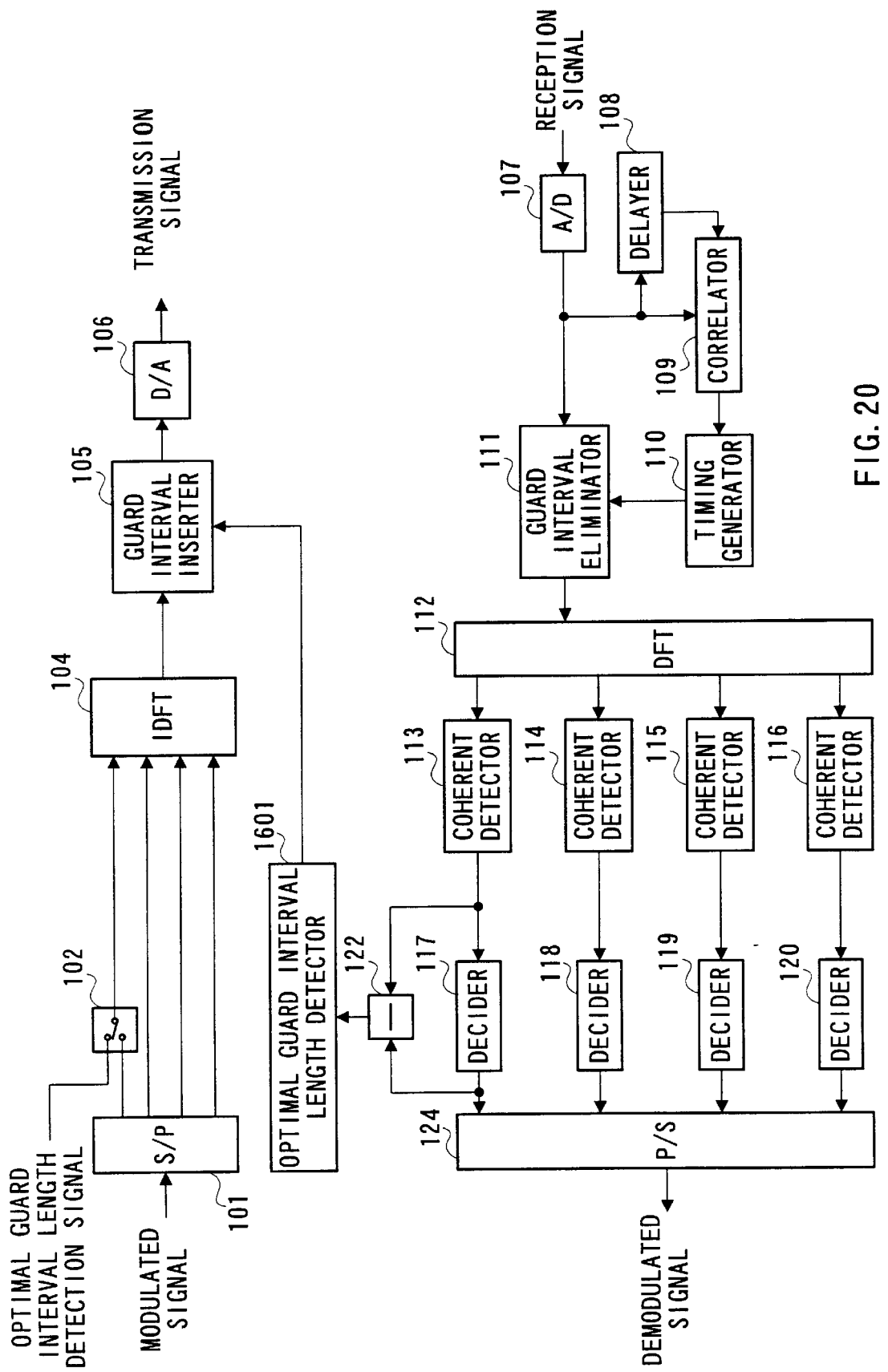
FIG. 20 is a block diagram showing an outlined configuration of an OFDM transmission/reception apparatus according to Embodiment 11 of the present invention.

The OFDM transmission/reception apparatus of the present embodiment is explained below using FIG. 20. FIG. 20 is a block diagram showing an outlined configuration of the OFDM transmission/reception apparatus of Embodiment 11 of the present invention. The parts with the same configuration as that of Embodiment 1 are assigned the same numbers and their detailed explanations are omitted.

The present embodiment describes a case where a radio communication is carried out using a OFDM/TDD system.

In FIG. 20, optimal guard interval length detector 1601 outputs a control signal about the guard interval length to guard interval inserter 105.

In a TDD system, a same frequency is used for the uplink and downlink, and therefore the channel information is identical for the uplink and downlink. Therefore, the OFDM transmission/reception apparatus of the present embodiment can eliminate the need for transmission/reception of the optimal guard interval length selection control signal by transmitting a signal using the optimal guard interval length detected from the reception signal in both radio stations carrying out a radio communication.

In the case that the OFDM transmission/reception apparatus of the present embodiment uses the optimal guard interval length selection control signal, the OFDM transmission/reception apparatus of the present embodiment can also detect the optimal guard interval length even if an error exists in the optimal guard interval length selection control signal after demodulation. Thus, the OFDM transmission/reception apparatus of the present embodiment can prevent the error rate characteristic of the control signal from deteriorating.

Embodiment 12

The OFDM transmission/reception apparatus of Embodiment 12 of the present invention has the same configuration as that of the OFDM transmission/reception apparatus of Embodiment 11, and detects the optimal guard interval length using a control channel signal.

Figure 21:
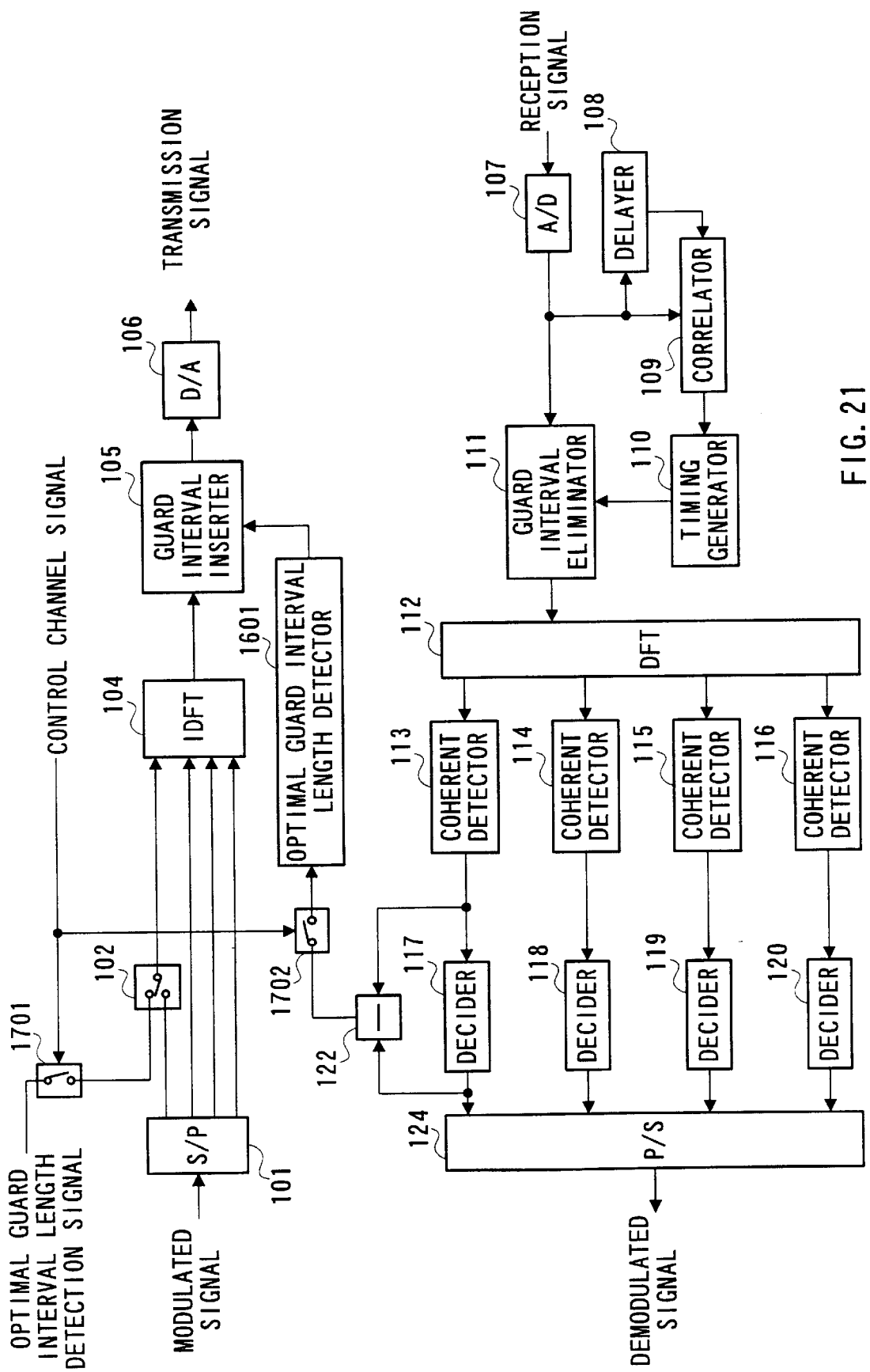
FIG. 21 is a block diagram showing an outlined configuration of an OFDM transmission/reception apparatus according to Embodiment 12 of the present invention.

The OFDM transmission/reception apparatus of the present embodiment is explained below using FIG. 21. FIG. 21 is a block diagram showing an outlined configuration of the OFDM transmission/reception apparatus of Embodiment 12 of the present invention. The parts with the same configuration as that of Embodiment 11 are assigned the same numbers and their detailed explanations are omitted.

In FIG. 21, switches 1701 and 1702 are controlled by a control channel signal whose error is corrected more strongly than the user channel signal. That is, the control channel signal controls the timing of inserting an optimal guard interval length detection signal in the transmission system and the timing of extracting an optimal guard interval length detection signal in the reception system.

As shown above, the OFDM transmission/reception apparatus of the present embodiment detects the guard interval length using a control channel signal, and therefore can reduce the probability that an error will occur in the control signal that the optimal guard interval length detector outputs.

Embodiment 13

The OFDM transmission/reception apparatus of Embodiment 13 of the present invention has the same configuration as that of the OFDM transmission/reception apparatus of Embodiment 1, and controls the selection of the guard interval length to be added to a valid symbol using a known signal (Unique Word; hereinafter referred to as "UW") to acquire synchronization of a plurality of frames.

Figure 22:
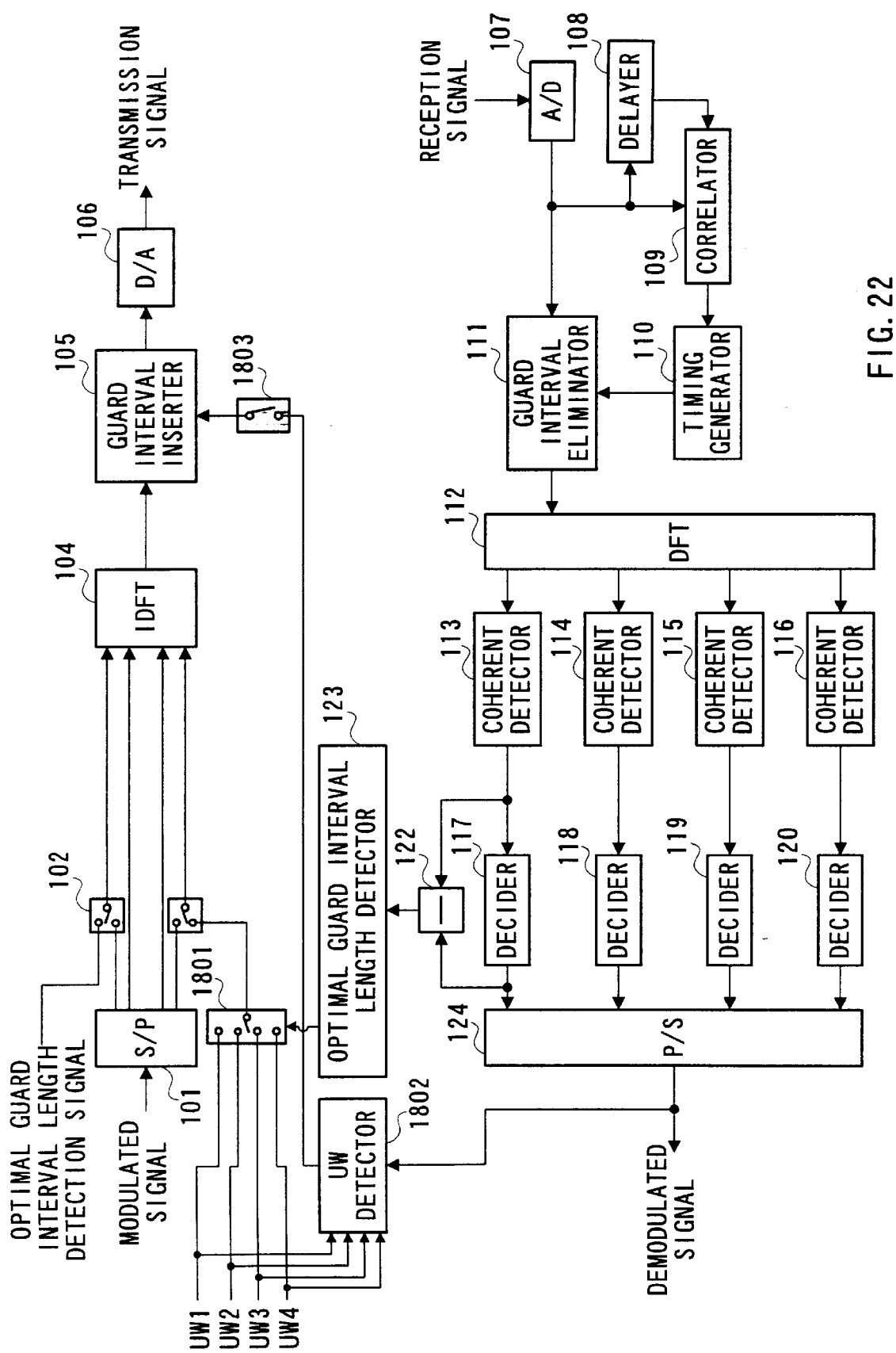
FIG. 22 is a block diagram showing an outlined configuration of an OFDM transmission/reception apparatus according to Embodiment 13 of the present invention.
Figure 23:
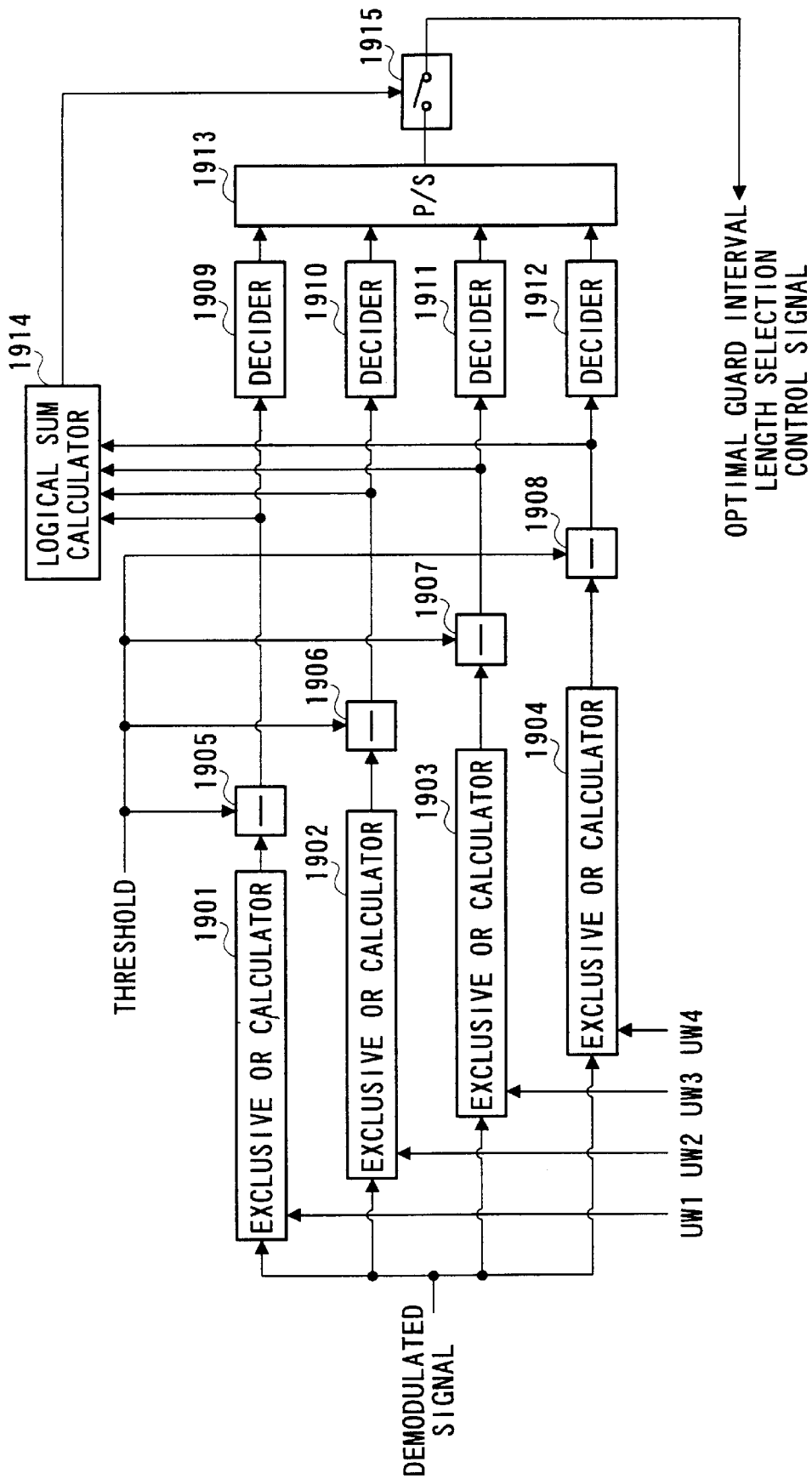
FIG. 23 is a block diagram showing an outlined configuration of a UW detector of the OFDM transmission/reception apparatus according to Embodiment 13 of the present invention.

The OFDM transmission/reception apparatus of the present embodiment is explained below using FIG. 22 and FIG. 23. FIG. 22 is a block diagram showing an outlined configuration of the OFDM transmission/reception apparatus of Embodiment 13 of the present invention. FIG. 23 is a block diagram showing an outlined configuration of a UW detector of the OFDM transmission/reception apparatus of Embodiment 13 of the present invention. The parts with the same configuration as that of Embodiment 1 are assigned the same numbers and their detailed explanations are omitted.

In FIG. 22, the output of optimal guard interval length detector 123 controls switch 1801. One of UW1 to UW4 is selected by switch 1801 according to this control and output to switch 103.

Here, in the case that the decision error of UW1 is bad, UW1 indicates that a guard interval length of "symbol period/2" is necessary. Likewise, UW2 indicates that a guard interval length of "3×symbol period/8" is necessary; UW3, guard interval length of "symbol period/4"; and UW4, guard interval length of "symbol period/8."

UW detector 1802 detects UW in the demodulated reception signal. The detected UW is selectively output to guard interval inserter 105 by switch 1803.

Generally, in frame synchronization acquisition using UW, an exclusive OR calculation between UW and a demodulated signal is performed. In the case that the accumulated value of the results of the exclusive OR calculations exceeds a threshold, it is determined that frame synchronization has been acquired. Here, even if errors exist in the UW after demodulation in the case that the number of those errors is within the range that the accumulated value of the exclusive OR calculation results exceeds a threshold, frame synchronization is correctly acquired.

In FIG. 23, exclusive OR calculators 1901 to 1904 perform exclusive OR calculations between the demodulated signal input to UW detector 1802 and each of UW1 to UW4. Subtractors 1905 to 1908 perform subtractions between the outputs of exclusive OR calculators 1901 to 1904 and a threshold.

Deciders 1909 to 1912 judge the outputs of subtractors 1905 to 1908. Then P/S converter 1913 converts 4 parallel decision data to single serial data.

Logical sum calculator 1914 performs a logical sum calculation of the outputs of subtractors 1905 to 1908. Switch 1915 is controlled by the output of logical sum calculator 1914 and selectively outputs the output of P/S converter 1913.

As shown above, the OFDM transmission/reception apparatus of the present embodiment acquires frame synchronization using a plurality of UWs and controls the selection of a guard interval length according to the information on which UW has acquired frame synchronization. This allows the OFDM transmission/reception apparatus of the present embodiment to reduce the probability that an error will exist in the guard interval length selection control signal and thus prevent the error rate characteristic from deteriorating.

By the way, the OFDM transmission/reception apparatus of the present embodiment is especially valid for an OFDM system other than TDD.

Embodiment 14

The OFDM transmission/reception apparatus of Embodiment 14 of the present invention has the same configuration as that of the OFDM transmission/reception apparatus of Embodiment 13, and reduces the number of UWs used by the UW detector.

Figure 24:
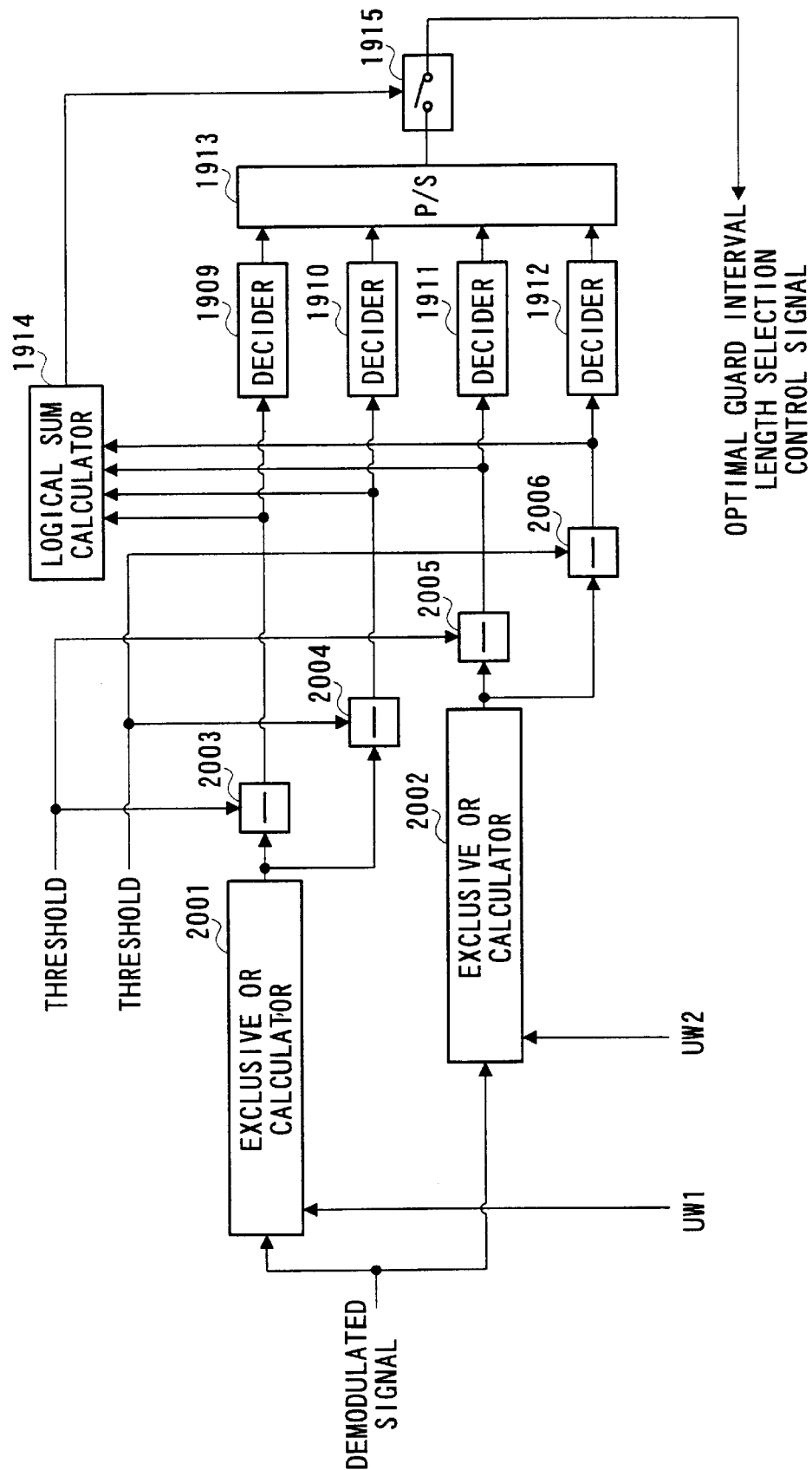
FIG. 24 is a block diagram showing an outlined configuration of a UW detector of an OFDM transmission/reception apparatus according to Embodiment 14 of the present invention.

The UW detector of the OFDM transmission/reception apparatus of the present embodiment is explained below using FIG. 24. FIG. 24 is a block diagram showing an outlined configuration of the UW detector of the OFDM transmission/reception apparatus of Embodiment 14 of the present invention. The parts with the same configuration as that of Embodiment 13 are assigned the same numbers and their detailed explanations are omitted.

In FIG. 24, exclusive OR calculator 2001 performs an exclusive OR calculation of the demodulated signal and UW1. Exclusive OR calculator 2001 outputs the result of the exclusive OR calculation of the demodulated signal and UW1 to subtractor 2003. Exclusive OR calculator 2001 also outputs the result of the exclusive OR calculation of the demodulated signal and the inverted signal of UW1 to subtractor 2004. Likewise, exclusive OR calculator 2002 performs an exclusive OR calculation of the demodulated signal and UW2. Exclusive OR calculator 2002 outputs the result of the exclusive OR calculation of the demodulated signal and UW2 to subtractor 2005. Exclusive OR calculator 2002 also outputs the result of the exclusive OR calculation of the demodulated signal and the inverted signal of UW2 to subtractor 2006.

Here, in the case that the decision error of UW1 is large, UW1 indicates that a guard interval length of "symbol period/2" is necessary. Likewise, the inverted signal of UW1 indicates a guard interval length of "3×symbol period/8" is necessary; UW2, a guard interval length of "symbol period/4"; and the inverted signal of UW2, a guard interval length of "symbol period/8."

As shown above, the OFDM transmission/reception apparatus of the present embodiment can reduce to half the number of exclusive OR calculations carried out by the UW detector by using the inverted signal of UW. This reduces the amount of calculation and simplifies the circuit configuration.

Embodiment 15

The OFDM transmission/reception apparatus of Embodiment 15 of the present invention has the same configuration as that of the OFDM transmission/reception apparatus of Embodiment 13, and carries out UW detection using a demodulated signal prior to decision processing.

Figure 25:
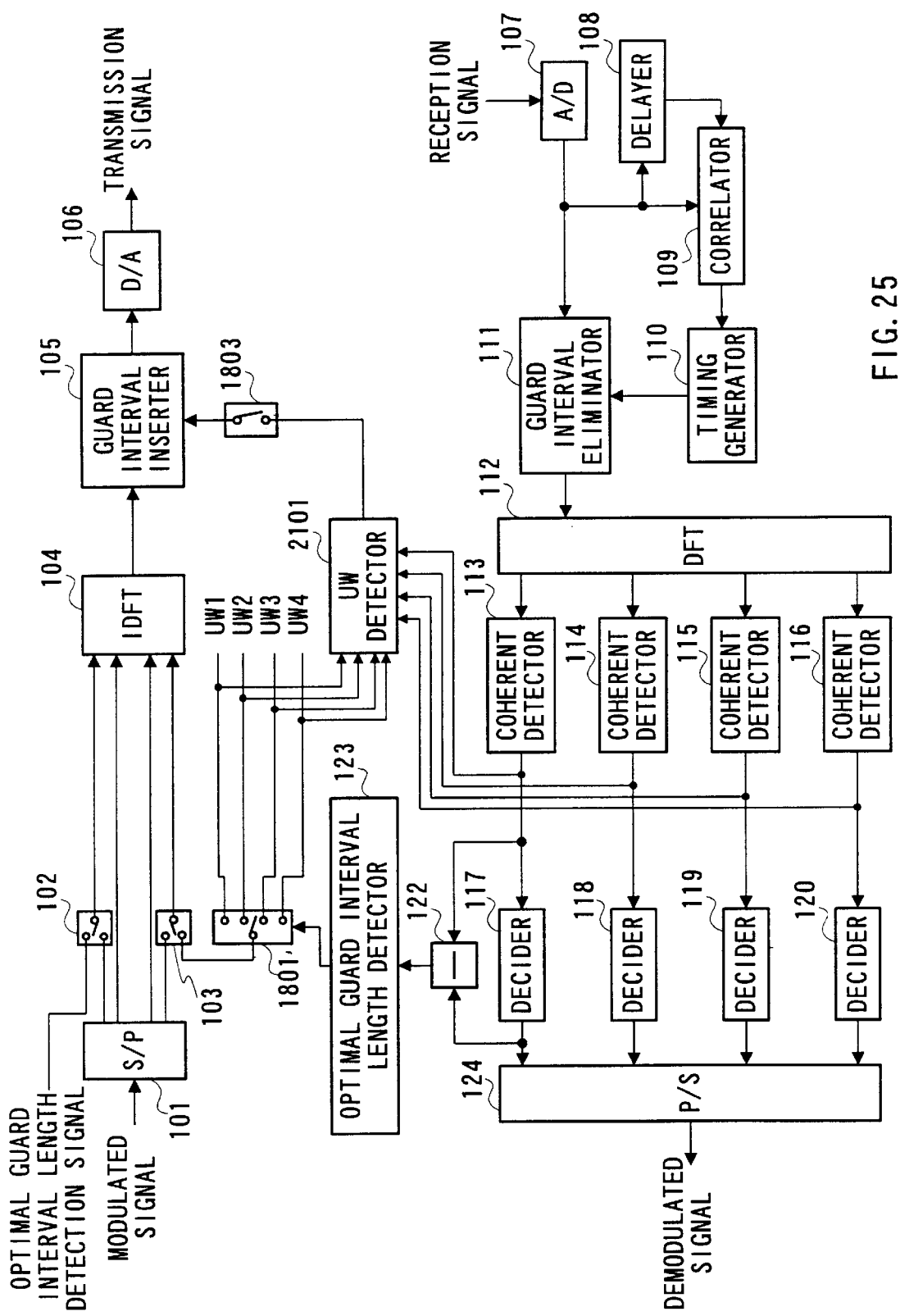
FIG. 25 is a block diagram showing an outlined configuration of an OFDM transmission/reception apparatus according to Embodiment 15 of the present invention.
Figure 26:
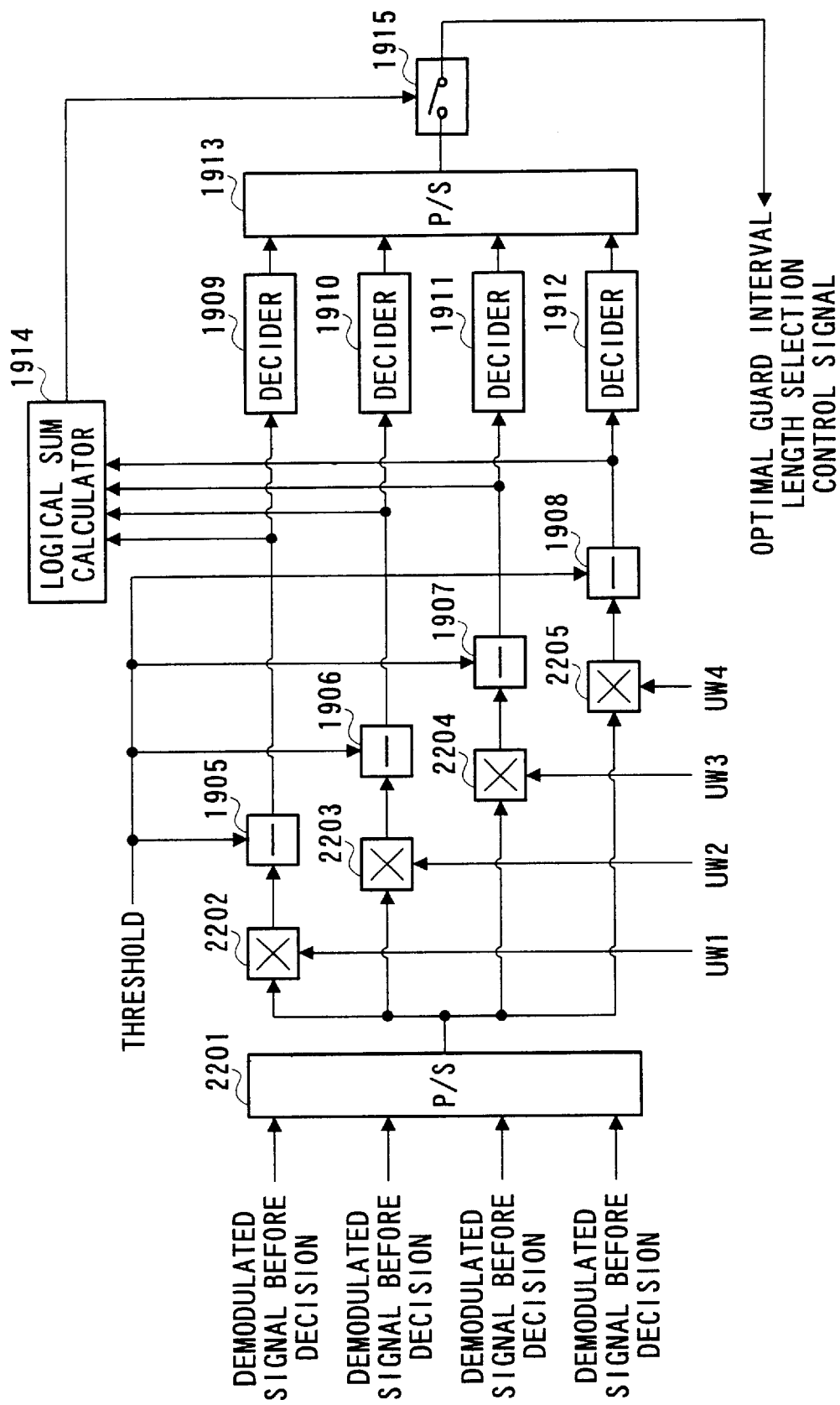
FIG. 26 is a block diagram showing an outlined configuration of a UW detector of the OFDM transmission/reception apparatus according to Embodiment 15 of the present invention.

The OFDM transmission/reception apparatus of the present embodiment is explained below using FIG. 25 and FIG. 26. FIG. 25 is a block diagram showing an outlined configuration of the OFDM transmission/reception apparatus of Embodiment 15 of the present invention. FIG. 26 is a block diagram showing an outlined configuration of a UW detector of the OFDM transmission/reception apparatus of Embodiment 15 of the present invention. The parts with the same configuration as that of Embodiment 13 are assigned the same numbers and their detailed explanations are omitted.

As shown in FIG. 25, synchronization detection signals before being input to Deciders 117 to 120 are input to UW detector 2101.

Furthermore, as shown in FIG. 26, the demodulated signals input to UW detector 2101 are converted to a serial signal by P/S converter 2201. Multipliers 2202 to 2205 multiply the output signal of P/S converter 2201 by UW1 to UW4, respectively.

As shown above, the OFDM transmission/reception apparatus of the present embodiment acquires frame synchronization using coherent detected signals prior to decision processing, and thus can reduce the probability that an error will occur in a control signal.

Embodiment 16

The OFDM transmission/reception apparatus of Embodiment 16 of the present invention has the same configuration as that of the OFDM transmission/reception apparatus of Embodiment 13, and uses a variable threshold in UW detectors according to decision errors.

Figure 27:
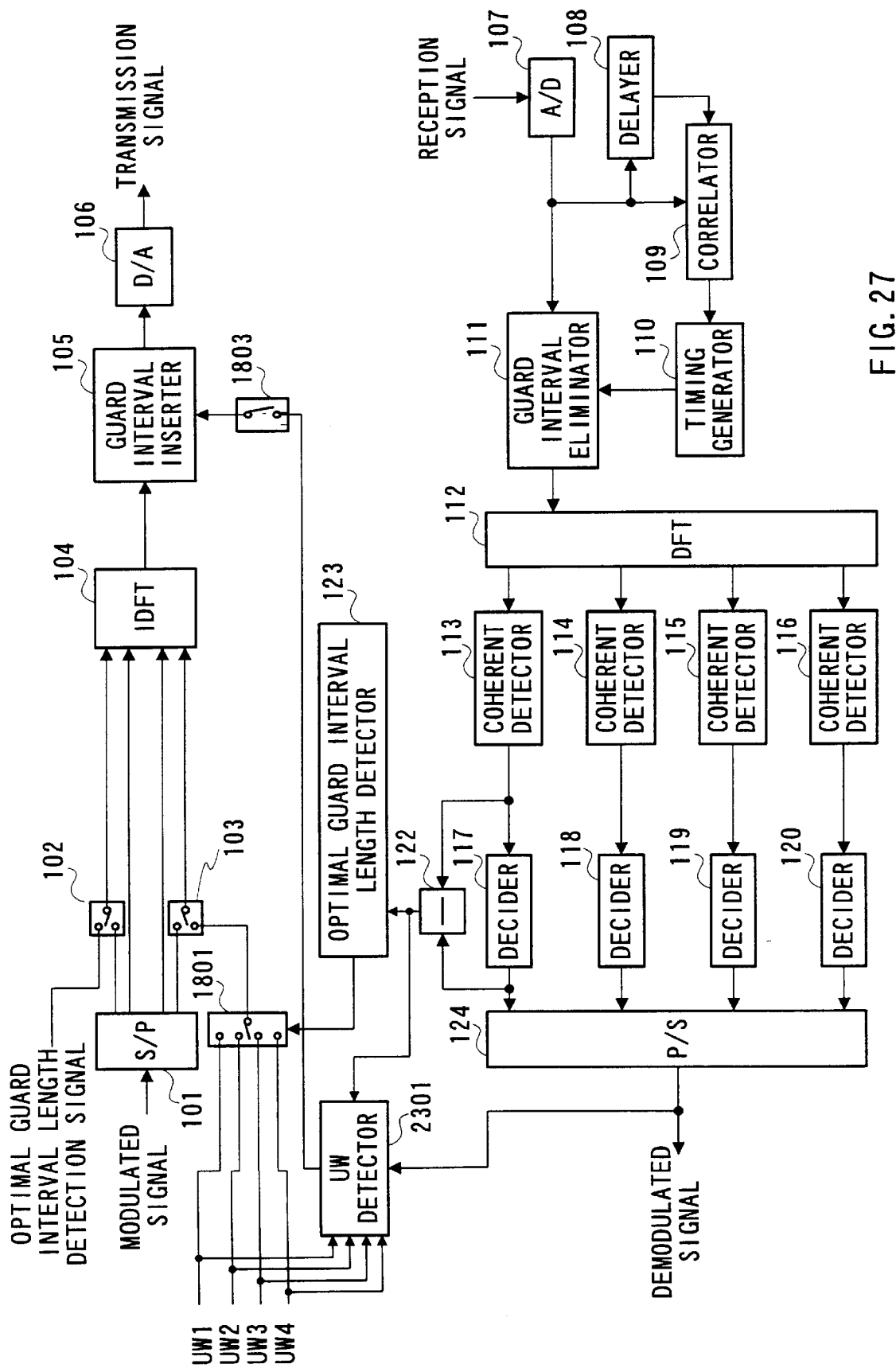
FIG. 27 is a block diagram showing an outlined configuration of an OFDM transmission/reception apparatus according to Embodiment 16 of the present invention.
Figure 28:
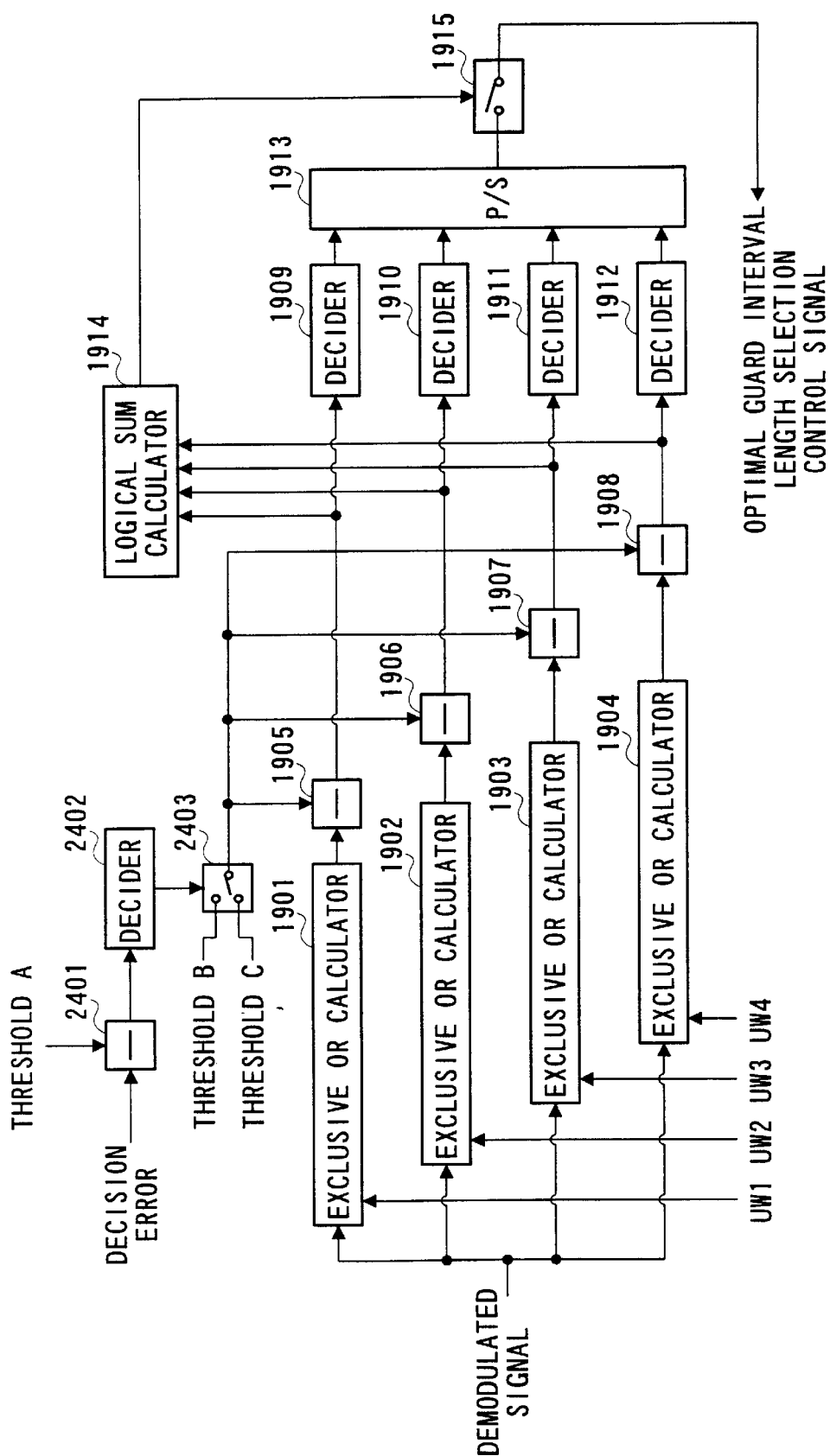
FIG. 28 is a block diagram showing an outlined configuration of a UW detector of the OFDM transmission/reception apparatus according to Embodiment 16 of the present invention.

The OFDM transmission/reception apparatus of the present embodiment is explained below using FIG. 27 and FIG. 28. FIG. 27 is a block diagram showing an outlined configuration of the OFDM transmission/reception apparatus of Embodiment 16 of the present invention. FIG. 28 is a block diagram showing an outlined configuration of the UW detector of the OFDM transmission/reception apparatus of Embodiment 16 of the present invention. The parts with the same configuration as that of Embodiment 13 are assigned the same numbers and their detailed explanations are omitted.

As shown in FIG. 27, the decision error of carrier 1, which is the output of subtractor 122, together with a demodulated signal is input to UW detector 2301. The decision error need not always be from carrier 1.

Furthermore, as shown in FIG. 28, subtractor 2401 performs a subtraction between the decision error input to UW detector 2301 and threshold A. Then, Decider 2402 decides which is larger/smaller based on the subtraction result. Switch 2403 is controlled by the output of Decider 2402. Switch 2403 outputs threshold B in the case that the decision error is not less than the threshold and outputs threshold C in the case that the decision error is less than the threshold. Here, suppose threshold B>threshold C.

As shown above, the OFDM transmission/reception apparatus of the present embodiment uses a variable threshold used to acquire frame synchronization in the UW detectors according to the channel quality. That is, the OFDM transmission/reception apparatus of the present embodiment decreases the threshold when the channel quality is bad. This allows the OFDM transmission/reception apparatus of the present embodiment to improve the accuracy of frame synchronization acquisition. Moreover, in the case that the channel quality is bad, the OFDM transmission/reception apparatus of the present embodiment can also improve the accuracy of frame synchronization acquisition by reducing the threshold using the channel quality information of the previous burst (for example, decision error).

Embodiment 17

The OFDM transmission/reception apparatus of Embodiment 17 of the present invention has the same configuration as that of the OFDM transmission/reception apparatus of Embodiment 13, and in the case that the decision error in the UW detector exceeds a threshold, it controls in such a way that the guard interval length is maintained.

Figure 29:
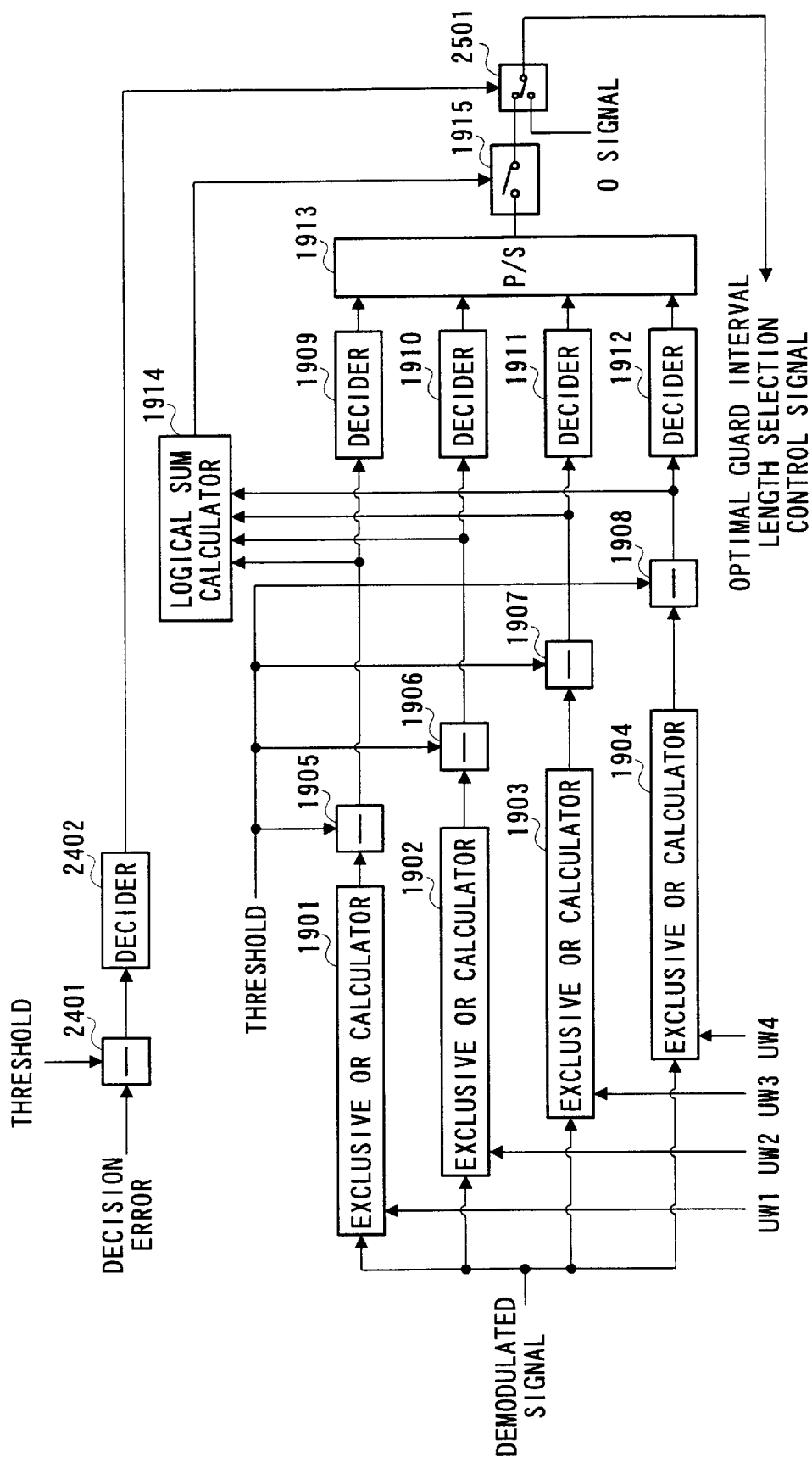
FIG. 29 is a block diagram showing an outlined configuration of a UW detector of an OFDM transmission/reception apparatus according to Embodiment 17 of the present invention.

The OFDM transmission/reception apparatus of the present embodiment is explained below using FIG. 29. FIG. 29 is a block diagram showing an outlined configuration of the UW detector of the OFDM transmission/reception apparatus of Embodiment 17 of the present invention. The parts with the same configuration as that of Embodiments 13 and 16 are assigned the same numbers and their detailed explanations are omitted.

In FIG. 29, switch 2501 is controlled by the output of Decider 2402. Switch 2501 selects either the output of switch 1915 or a zero value and outputs it.

As shown above, in the case that the channel quality is bad in the UW detector, the OFDM transmission/reception apparatus of the present embodiment outputs a zero value to maintain the guard interval length without changing the threshold for acquisition of frame synchronization. Therefore, the OFDM transmission/reception apparatus of the present embodiment can prevent the error rate characteristic from deteriorating or frame synchronization from failing to be acquired, a situation which is likely to occur when a threshold is changed with a bad channel quality.

Embodiment 18

The OFDM transmission/reception apparatus of Embodiment 18 of the present invention has the same configuration as that of the OFDM transmission/reception apparatus of Embodiment 1, and does not change the length of a guard interval to be added to a valid symbol indicating important information, but always keeps it constant independently of the channel quality.

The "guard interval length necessary to eliminate delayed signal" described so far in Embodiments 1 to 17 has been the length apparently enough to achieve an error rate in a communication related to user data such as a message (hereinafter referred to as "normal information"). However, higher accuracy is required for important information such as control information and retransmission information than normal information in terms of the error rate.

Thus, the OFDM transmission/reception apparatus of the present embodiment distinguishes important information from normal information in a transmission signal and does not change the length of a guard interval to be added to the valid symbol indicating important information according to the channel quality, but always keeps it constant.

The OFDM transmission/reception apparatus of the present embodiment sets the guard interval length to be added to the valid symbol indicating the important information above to a certain length that allows an error rate lower than the error rate achieved by the guard interval to be added to the valid symbol indicating normal information.

Figure 30:
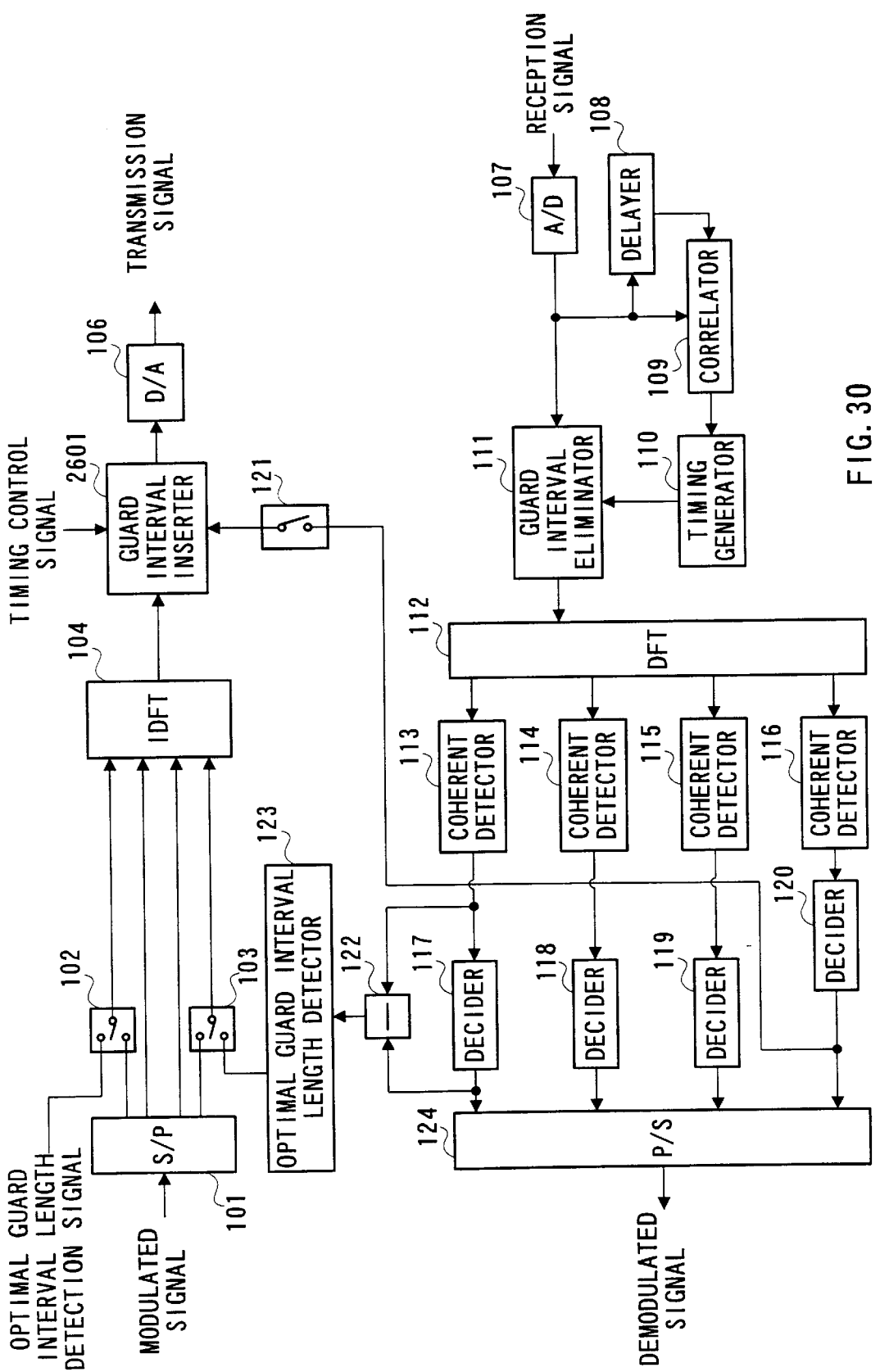
FIG. 30 is a block diagram showing an outlined configuration of an OFDM transmission/reception apparatus according to Embodiment 18 of the present invention.
Figure 31:
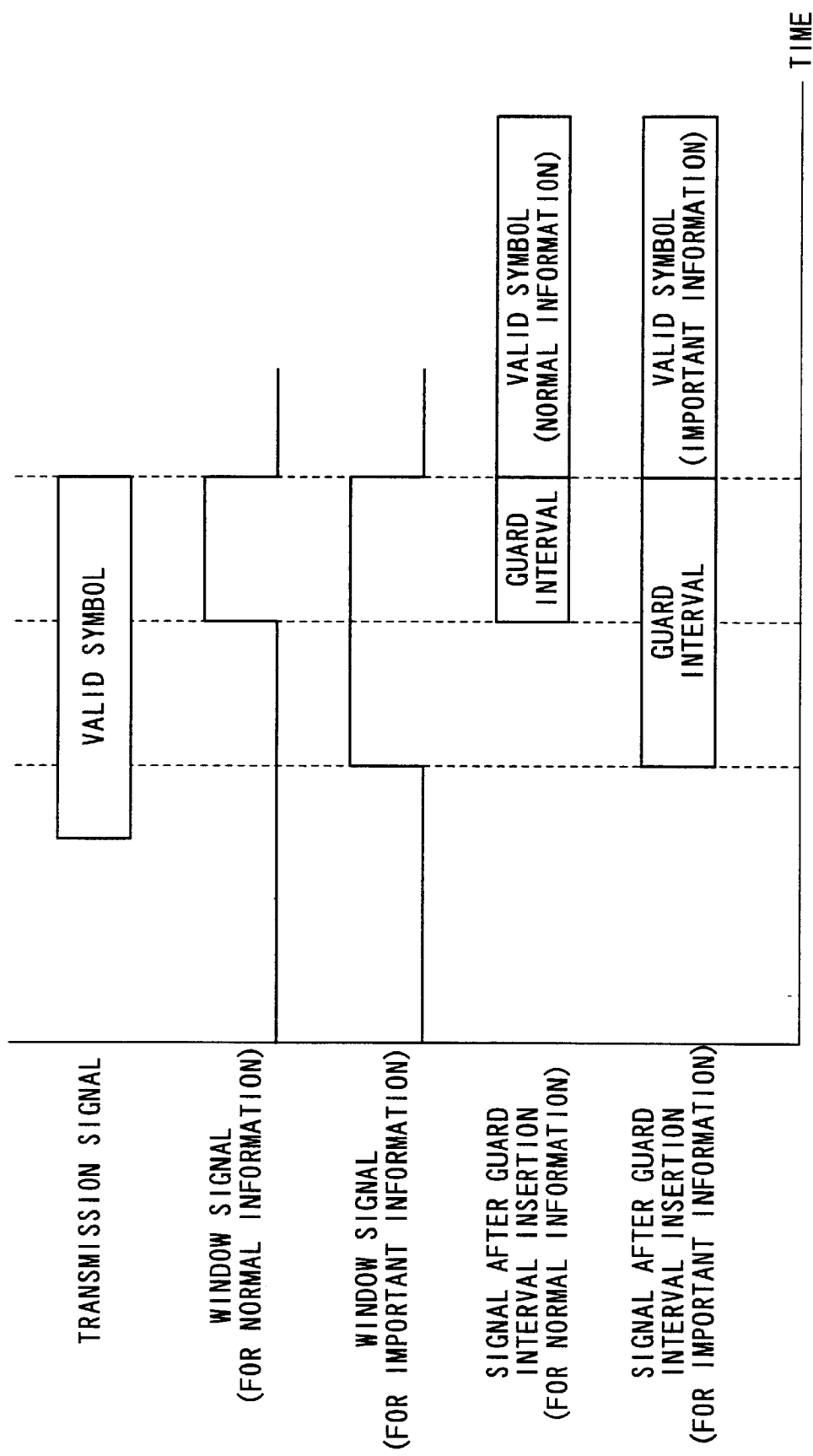
FIG. 31 is a timing chart showing an example of the step of a guard interval inserter of the OFDM transmission/reception apparatus according to Embodiment 18 of the present invention adding a guard interval.
Figure 32:
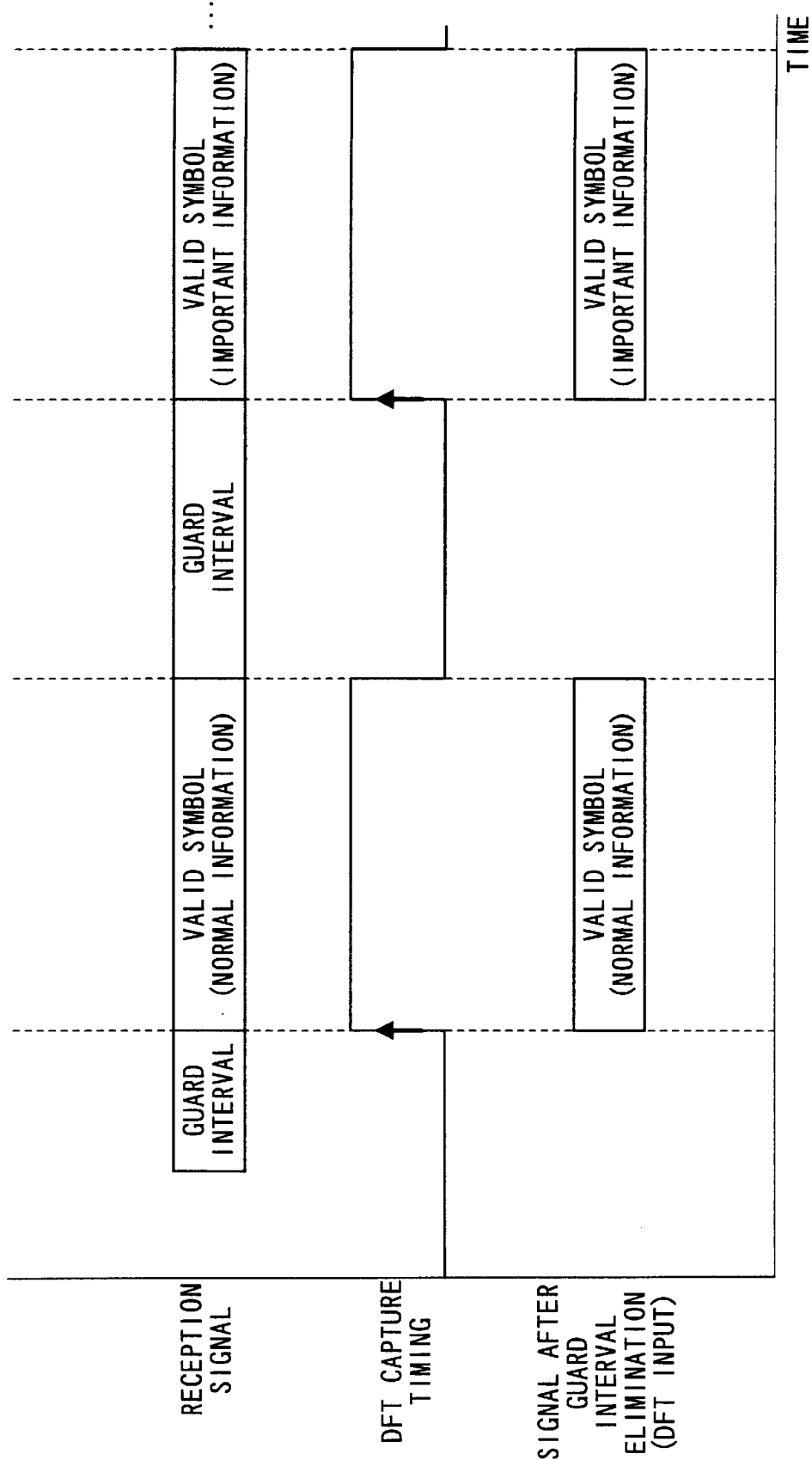
FIG. 32 is a timing chart showing an example of the step of a guard interval eliminator of the OFDM transmission/reception apparatus according to Embodiment 18 of the present invention eliminating a guard interval.

The OFDM transmission/reception apparatus of the present embodiment is explained below using FIG. 30 to FIG. 32. FIG. 30 is a block diagram showing an outlined configuration of the OFDM transmission/reception apparatus of Embodiment 18 of the present invention. FIG. 31 is a timing chart showing an example of the step of the guard interval inserter of the OFDM transmission/reception apparatus of Embodiment 18 of the present invention adding a guard interval. FIG. 32 is a timing chart showing an example of the step of the guard interval eliminator of the OFDM transmission/reception apparatus of Embodiment 18 of the present invention eliminating a guard interval. The parts with the same configuration as that of Embodiment 1 are assigned the same numbers and their detailed explanations are omitted.

In FIG. 30, a known timing control signal is input to guard interval inserter 2601. Therefore, guard interval inserter 2601 can distinguish a symbol indicating normal information from another symbol indicating important information in the transmission symbol based on this timing.

As described above, guard interval inserter 2601 changes the length of a guard interval to be added to a valid symbol according to the channel quality. However, based on the decision result above, guard interval inserter 2601 sets the length of the guard interval to be added to the valid symbol indicating important information to a predetermined fixed value independently of the channel quality. On the other hand, in the case of the valid symbol indicating normal information, guard interval inserter 2601 sets a guard interval length according to the channel quality using the method described in Embodiment 1.

FIG. 31 shows an example of the step of the guard interval inserter of the OFDM transmission/reception apparatus of the present embodiment adding a guard interval. As shown in the chart, a longer guard interval is added to the valid symbol indicating important information than the guard interval added to the valid symbol indicating normal information.

FIG. 32 shows an example of the step of guard interval eliminator 111 of the OFDM transmission/reception apparatus of the present embodiment eliminating a guard interval. Guard interval eliminator 111 is informed of the timings of starting the guard interval and starting the valid symbol. Therefore, guard interval eliminator 111 can extract only valid symbols and eliminate guard intervals through normal processing even if the guard interval length in the valid symbol indicating normal information and the valid symbol indicating important information changes.

As shown above, the OFDM transmission/reception apparatus of the present embodiment distinguishes important information from normal information in a transmission signal and sets the length of a guard interval to be added to the valid symbol indicating the important information to a predetermined value that implements an error rate lower than the error rate about the normal information independently of the channel quality. Through this, the OFDM transmission/reception apparatus of the present embodiment can change the length of a guard interval to be added to the valid symbol indicating the normal information thereby improving the transmission efficiency, while it can set a lower error rate for important information than for normal information. Thus, the OFDM transmission/reception apparatus of the present embodiment can improve the channel quality and transmission efficiency.

Embodiment 19

The OFDM transmission/reception apparatus of Embodiment 19 of the present invention has the same configuration as that of the OFDM transmission/reception apparatus of Embodiment 18, and always adds to the valid symbol indicating important information a guard interval longer by a certain length than the guard interval to be added to the valid symbol indicating normal information.

Since the OFDM transmission/reception apparatus of Embodiment 18 always adds a certain length of guard interval to the valid symbol indicating important information, in the case that the error rate is low and the channel quality is high, a longer guard interval than is necessary is added.

Thus, in the guard interval length setting in the present embodiment, the OFDM transmission/reception apparatus sets the length of the guard interval to be added to the valid symbol indicating important information to the length of the guard interval to be added to the valid symbol indicating normal information according to the channel quality plus a predetermined constant value.

In this way, the OFDM transmission/reception apparatus of the present embodiment distinguishes important information from normal information in the transmission signal and always sets the length of the guard interval to be added to the valid symbol indicating important information longer than the guard interval to be added to the valid symbol indicating normal information by a predetermined constant value. Through this, the OFDM transmission/reception apparatus of the present embodiment can change the length of a guard interval to be added to the valid symbol indicating normal information thereby improving the transmission efficiency, while it can set a lower error rate for important information than for normal information. Thus, the OFDM transmission/reception apparatus of the present embodiment can improve the channel quality and transmission efficiency.

Embodiment 20

The OFDM transmission/reception apparatus of Embodiment 20 of the present invention has the same configuration as that of the OFDM transmission/reception apparatus of Embodiment 19, and adds to the valid symbol indicating important information a guard interval longer by a predetermined value determined according to the channel quality than the guard interval to be added to the valid symbol indicating normal information.

The OFDM transmission/reception apparatus of Embodiment 19 of the present invention always adds to the valid symbol indicating important information a guard interval consisting of the guard interval added to the valid symbol indicating normal information according to the channel quality plus a predetermined constant length. Therefore, under a condition with a high error rate and poor channel quality, there may be cases where it is impossible to improve the error rate of important information by predetermined percentage compared to the error rate of normal information.

Therefore, in the guard interval length setting of the present embodiment, the OFDM transmission/reception apparatus sets the length of the guard interval to be added to the valid symbol indicating important information to the length of the guard interval to be added to the valid symbol indicating normal information according to the channel quality plus a predetermined length proportional to the channel quality.

That is, as the channel quality improves and the error rate decreases, the OFDM transmission/reception apparatus of the present embodiment shortens the predetermined value added to the length of the guard interval to be added to the valid symbol indicating normal information, and to the contrary as the channel quality deteriorates and the error rate increases, the OFDM transmission/reception apparatus of the present embodiment lengthens the predetermined value added to the length of the guard interval to be added to the valid symbol indicating normal information.

As shown above, the OFDM transmission/reception apparatus of the present embodiment distinguishes important information from normal information in the transmission signal and sets the length of the guard interval to be added to the valid symbol indicating important information longer than the guard interval to be added to the valid symbol indicating normal information by a predetermined variable length according to the channel quality. Through this, the OFDM transmission/reception apparatus of the present embodiment can change the length of a guard interval to be added to the valid symbol indicating normal information thereby improving the transmission efficiency, while it can set a lower error rate for important information than for normal information. Thus, the OFDM transmission/reception apparatus of the present embodiment can improve the channel quality and transmission efficiency.

Here, in contrast to the configuration of the OFDM transmission/reception apparatus of Embodiments 1 to 17 with a variable guard interval length, the configuration of the OFDM transmission/reception apparatus of Embodiments 18 to 20 above distinguishes important information from normal information in the transmission signal and sets the guard interval length as follows:

1) For normal information: variable according to channel quality; for important information: constant
2) For normal information: variable according to channel quality; for important information: constant difference from the one "for normal information"
3) For normal information: variable; for important information: difference from the one "for normal information" is variable according to channel quality.

These are intended to keep the error rate of important information lower than the error rate of normal information, and the OFDM transmission/reception apparatus can take any configuration other than the above 3 configurations so long as it can achieve these purposes.

Embodiments 18 to 20 above are Embodiment 1 with the additional function to improve the error rate about important information. In like manner, it is also possible to add the additional function to improve the error rate about important information to Embodiments 2 to 17 by combining Embodiments 18 to 20 above with Embodiments 2 to 17.

Embodiments 18 to 20 above can improve the error rate not only about important information but also about specific information and packet (burst). Embodiments 18 to 20 above can have a longer guard interval than other information or packet (burst) in the case of multicast, for example.

As explained above, the present invention is capable of improving transmission efficiency while maintaining the function of adding guard intervals and eliminating delayed signals.

The present invention is not limited to the above described embodiments, and various variations and modifications may be possible without departing from the scope of the present invention.

This application is based on the Japanese Patent Application No.HEI 10-365430 filed on Dec. 22, 1998 and the Japanese Patent Application No.HEI 11-074621 filed on Mar. 18, 1999, entire content of which is expressly incorporated by reference herein.

What is claimed is:

1. An OFDM transmission/reception apparatus comprising:
   a guard interval inserter that inserts part of a valid symbol at the start of the valid symbol of a transmission signal as a guard interval;
   a guard interval length regulator that extends/contracts the length of the guard interval that the guard interval inserter inserts into the transmission signal;
   a first inserter that inserts a guard interval length detection signal comprising a plurality of symbols indicating different guard interval lengths into one carrier of said transmission signal; and a second inserter that inserts a guard interval length selection control signal into one carrier of said transmission signal.

2. The OFDM transmission/reception apparatus according to claim 1, further comprising:
a first extractor that extracts a decision error of the guard interval length detection signal from a reception signal;
a generator that generates the guard interval length selection control signal based on the output of the first extractor and outputs the guard interval length selection control signal to said second inserter;
a second extractor that extracts the guard interval length selection control signal from the reception signal; and
a guard interval length controller that controls said guard interval length regulator based on the output of the second extractor.

3. The OFDM transmission/reception apparatus according to claim 1, wherein said guard interval length regulator comprises:
a signal retainer that retains a plurality of window signals generating guard intervals by calculating a logical product with valid symbols;
a logical product calculator that calculates a logical product of the transmission signal and one of said window signals; and
a selector that selectively reads a signal from said signal retainer according to the control from a guard interval length controller and inputs the signal to said logical product calculator.

4. The OFDM transmission/reception apparatus according to claim 2, wherein said generator comprises:
a splitter that splits the decision error of the guard interval length detection signal extracted by said first extractor for every symbol; and
a symbol extractor that extracts the symbol indicating the shortest guard interval length from among symbols whose difference from the decision error of the symbol indicating the longest guard interval length falls below a threshold.

5. The OFDM transmission/reception apparatus according to claim 4, wherein said generator comprises an averager that averages differences calculated by said symbol extractor between the decision error of the symbol indicating the longest guard interval length and the decision errors of symbols other than the symbol indicating the longest guard interval length.

6. The OFDM transmission/reception apparatus according to claim 2, wherein said first inserter inserts guard interval length detection signals into a plurality of carriers of the transmission signal, and
said first extractor extracts guard interval length detection signals from all carriers into which said first inserter inserted the guard interval length detection signals and averages these guard interval length detection signals.

7. The OFDM transmission/reception apparatus according to claim 6, wherein said first extractor extracts guard interval length detection signals from all carriers into which said first inserter inserted the guard interval length detection signals, and
said generator calculates a logical product of the output of said symbol extractor and every decision error of the symbol indicating the same guard interval length of each carrier.

8. The OFDM transmission/reception apparatus according to claim 6, wherein said first extractor does not extract guard interval length detection signals inserted into carriers whose reception level is not less than a threshold.

9. The OFDM transmission/reception apparatus according to claim 2, wherein said first inserter inserts a guard interval length detection signal comprising a known symbol, and
said first extractor calculates the difference between the known symbol inserted by said first inserter and the known symbol in the reception signal after coherent detection and outputs the difference to said generator.

10. The OFDM transmission/reception apparatus according to claim 4, wherein said symbol extractor in said generator uses a first threshold in the case that the decision error of the guard interval length detection signal extracted by said first extractor is not less than a predetermined constant value and uses a second threshold, which is smaller than the first threshold in the case that the decision error of the guard interval length detection signal extracted by said first extractor is less than the predetermined constant value.

11. The OFDM transmission/reception apparatus according to claim 4, wherein said generator comprises:
a counter that converts the output of said symbol extractor to a data signal per a predetermined time; and
a signal extractor that extracts signals including the symbol indicating the shortest guard interval length from among signals whose counter output is less than the threshold.

12. The OFDM transmission/reception apparatus according to claim 2, wherein said generator generates the guard interval length selection control signal so as to set the longest guard interval in the case that the reception level of the carrier into which the optimal guard interval length selection control signal detected by said second inserter is inserted falls below the threshold.

13. An OFDM transmission/reception apparatus comprising:
a guard interval inserter that inserts part of a valid symbol at the start of the valid symbol of a transmission signal as a guard interval;
a guard interval length regulator that extends/contracts the guard interval length that the guard interval inserter inserts into the transmission signal;
an inserter that inserts a guard interval length detection signal comprising a plurality of symbols indicating different guard interval lengths into one carrier of said transmission signal;
an extractor that extracts the decision error of a guard interval length detection signal from among the reception signals using the same frequency as that of the transmission signal; and
a guard interval length controller that controls said guard interval length regulator based on the output of the extractor.

14. The OFDM transmission/reception apparatus according to claim 13, wherein said apparatus controls insertion timing of said inserter and extraction timing of said extractor by control channel signals.

15. An OFDM transmission/reception apparatus comprising:
a guard interval inserter that inserts part of a valid symbol at the start of the valid symbol of a transmission signal as a guard interval;
a guard interval length regulator that extends/contracts the guard interval length that the guard interval inserter inserts into the transmission signal;
a first inserter that inserts a guard interval length detection signal into one carrier of the transmission signal;

a second inserter that inserts a plurality of frame synchronization acquisition known signals indicating different guard interval lengths into one carrier of the transmission signal;

a first extractor that extracts the decision error of a guard interval length detection signal from among the reception signal;

a known signal selection controller that is instructed which frame synchronization acquisition known signal should be inserted by said second inserter based on the output of the first extractor;

a second extractor that extracts a frame synchronization acquisition known signal from the demodulated reception signal; and a guard interval length controller that controls said guard interval length regulator so that the guard interval length is set to the guard interval length indicated by the known signal output by said second extractor.

16. The OFDM transmission/reception apparatus according to claim 15, wherein said second extractor comprises:
   a calculator that calculates an exclusive OR of the demodulated reception signal and the plurality of frame synchronization acquisition known signals of said second inserter;
   a comparator that compares the output of the calculator with a threshold; and
   a known signal specifier that specifies the frame synchronization acquisition known signals inserted by said second inserter based on the output of the comparator.

17. The OFDM transmission/reception apparatus according to claim 15, wherein said second extractor comprises:
   a calculator that calculates an exclusive OR of the demodulated reception signal, the plurality of frame synchronization acquisition known signals of said second inserter and their respective inverted signals;
   a comparator that compares the output of the calculator with a threshold; and
   a known signal specifier that specifies the frame synchronization acquisition known signals inserted by said second inserter based on the output of the comparator.

18. The OFDM transmission/reception apparatus according to claim 15, wherein said second extractor comprises:
   a calculator that calculates a multiplication of the reception signal after coherent detection and the plurality of frame synchronization acquisition known signals of said second inserter;
   a comparator that compares the output of the calculator with a threshold; and
   a known signal specifier that specifies the frame synchronization acquisition known signals inserted by said second inserter based on the output of the comparator.

19. The OFDM transmission/reception apparatus according to claim 16, wherein said comparator uses a first threshold in the case that the decision error of the guard interval length detection signal extracted by said first extractor is not less than a predetermined constant value and uses a second threshold, which is smaller than the first threshold, in the case that the decision error of the guard interval length detection signal extracted by said first extractor is less than the predetermined constant value.

20. The OFDM transmission/reception apparatus according to claim 15, wherein said guard interval length regulator retains the guard interval length in the case that the decision error of the guard interval length detection signal extracted by said first extractor is less than a predetermined constant value.

21. The OFDM transmission/reception apparatus according to claim 1, further comprising an important information controller that distinguishes important information in the transmission signal and controls said guard interval length regulator so that a longer guard interval than the guard interval added to the valid symbol indicating other information is added to the valid symbol indicating important information.

22. The OFDM transmission/reception apparatus according to claim 21, wherein said important information controller sets a guard interval with a fixed interval length that obtains a lower error rate than the error rate of the valid symbol indicating other information independently of the channel quality for the valid symbol indicating important information in the transmission signal.

23. The OFDM transmission/reception apparatus according to claim 21, wherein said important information controller sets a guard interval with the length of the guard interval added to the valid symbol indicating other information according to the channel quality plus a predetermined value for the valid symbol indicating important information in the transmission signal.

24. The OFDM transmission/reception apparatus according to claim 21, wherein said important information controller sets a guard interval with the length of the guard interval added to the valid symbol indicating other information according to the channel quality plus a variable value according to the channel quality for the valid symbol indicating important information in the transmission signal.

25. A communication terminal apparatus have an OFDM transmission/reception apparatus, said OFDM transmission/reception apparatus comprising:
   a guard interval inserter that inserts part of a valid symbol at the start of the valid symbol of a transmission signal as a guard interval;
   a guard interval length regulator that extends/contracts the guard interval length that the guard interval inserter inserts into the transmission signal;
   a first inserter that inserts a guard interval length detection signal comprising a plurality of symbols indicting different guard interval lengths into one carrier of said transmission signal; and
   a second inserter that inserts a guard interval length selection control signal into one carrier of said transmission signal.

26. A base station apparatus having an OFDM transmission/reception apparatus, said OFDM transmission/reception apparatus comprising:
   a guard interval inserter that inserts part of a valid symbol at the start of the valid symbol of a transmission signal as a guard interval;
   a guard interval length regulator that extends/contracts the guard interval length that the guard interval inserter inserts into the transmission signal;
   a first inserter that inserts a guard interval length detection signal comprising a plurality of symbols indicating different guard interval lengths into one carrier of said transmission signal; and
   a second inserter that inserts a guard interval length selection control signal into one carrier of said transmission signal.

27. An OFDM transmission/reception method comprising:
- the guard interval inserting step of inserting part of a valid symbol at the start of the valid symbol of a transmission signal as a guard interval;
- the guard interval length regulating step of extending/contracting the guard interval length that the guard interval inserting step inserts into the transmission signal;
- the first inserting step of inserting a guard interval length detection signal comprising a plurality of symbols indicating different guard interval lengths into one carrier of said transmission signal; and
- the second inserting step of inserting a guard interval length selection control signal into one carrier of said transmission signal.

* * * * *

UNITED STATES PATENT AND TRADEMARK OFFICE
CERTIFICATE OF CORRECTION

PATENT NO. : 6,714,511 B1
DATED : March 30, 2004
INVENTOR(S) : H. Sudo et al.

It is certified that error appears in the above-identified patent and that said Letters Patent is hereby corrected as shown below:

Title page,
Item [56], References Cited, OTHER PUBLICATIONS, please insert
-- Steendam, Heidi et al., "Guard Time Optimization for OFDM Transmission Over Fading Channels," IEEE Benelux Chapter on Vehicular Technology and Communications, Symposium on Communications and Vehicular Technology, SVCT proceedings, pages 42-48, October 1996, XP-002243075 --.

Signed and Sealed this

Twenty-fifth Day of January, 2005

JON W. DUDAS
*Director of the United States Patent and Trademark Office*